(12) United States Patent
Yamaguchi et al.

(10) Patent No.: US 7,160,495 B2
(45) Date of Patent: Jan. 9, 2007

(54) STATOR CORE RESIN MOLDING METHOD

(75) Inventors: Tsuyoshi Yamaguchi, Anjo (JP); Shingo Hashimoto, Anjo (JP); Tooru Kuroyanagi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 100 days.

(21) Appl. No.: 10/740,856

(22) Filed: Dec. 22, 2003

(65) Prior Publication Data

US 2004/0145081 A1    Jul. 29, 2004

(30) Foreign Application Priority Data

Dec. 26, 2002    (JP)    ............... 2002-377748

(51) Int. Cl.
  *B29C 45/14* (2006.01)
(52) U.S. Cl. ............ 264/254; 264/272.2; 264/275
(58) Field of Classification Search ............ None
  See application file for complete search history.

(56) References Cited

U.S. PATENT DOCUMENTS 3,058,156 A * 10/1962 O'Connor .............. 249/95
4,714,576 A * 12/1987 Cotton et al. ............. 264/46.5
4,950,438 A *  8/1990 Nakamura et al. ....... 264/272.2
6,663,816 B1 * 12/2003 Younsi et al. ............ 264/272.2
6,875,003 B1 *  4/2005 Aono ........................ 425/116

FOREIGN PATENT DOCUMENTS

JP    A 2000-125524    4/2000

* cited by examiner

*Primary Examiner*—Edmund H. Lee
(74) *Attorney, Agent, or Firm*—Oliff & Berridge, PLC

(57) ABSTRACT

An apparatus and method of forming a resin film on a surface of a stator core including a ring-shaped yoke portion, a plurality of teeth each protruding from the yoke portion in a radial direction, and a plurality of slots formed between the teeth, including forming the resin film on a section of the stator core by molding a synthetic resin material onto a surface of the section and repeating the molding on another section of the stator core so as to form the resin film on a whole periphery of the stator core, wherein the stator core is divided into a plurality of sections with respect to an axial center thereof.

8 Claims, 26 Drawing Sheets

STATOR CORE RESIN MOLDING METHOD

INCORPORATION BY REFERENCE

The disclosure of Japanese Patent Application No. 2002-377748 filed on Dec. 26, 2002, including the specification, drawings and abstract are incorporated herein by reference in their entirety.

BACKGROUND OF THE INVENTION

1. Field of Invention

The invention relates to a resin molding method, a resin molding structure, and a mold employed for a resin molding operation.

2. Description of Related Art

A stator core used for a motor such as an electric motor has a slot through which a coil formed by winding a wire is inserted. The wire wound into the coil is coated with an electric insulating resin material for providing electrical isolation. Generally, a portion of the stator core in contact with the coil is further insulated for sufficient electrical isolation.

In a well-known molding process for the insulating treatment with respect to the stator core, the portion of the stator core in contact with the coil is coated with an electric insulating synthetic resin material. This molding process has been widely employed to treat the stator core with a relatively small outer diameter, for example, the stator core used for driving a flexible disc drive. In the aforementioned molding process, the stator core is placed within a mold so as to cover a portion of the stator core on which a resin molding film is formed, and the resin molding film is formed by injecting a molten resin into the mold. A generally employed process for molding the stator core (resin molding process) is disclosed in JP-A-2000-125524, for example.

SUMMARY OF THE INVENTION

In the resin molding process as disclosed in the aforementioned publication, the stator core has to be placed within the mold so as to cover all of the portions on which the resin molding film is formed. Accordingly, it is difficult to prepare the mold for a relatively large sized stator core, and to employ the resin molding process itself. Also, when transitioning from an internal combustion engine that discharges harmful exhaust gas to a clean electric motor that discharges no exhaust gas, the need to develop a driving system tailored to such a transition has been increasingly raised. As a result, more and more large sized electric motors have been required. The resin molding process for good electrical isolation of the large electric motor, thus, is considered as being an indispensable technology for improving the performance of such an electric motor.

The invention thus provides a resin molding method, a resin molding structure and a mold used for the resin molding process capable of easily forming a resin molding film on a relatively large sized stator core.

The invention according to a first exemplary aspect includes a method of forming a resin film on a surface of a stator core including a ring-shaped yoke portion, a plurality of teeth each protruding from the yoke portion in a radial direction, and a plurality of slots formed between the teeth. The method includes the steps of forming the resin film on a section of the stator core by molding a synthetic resin material onto a surface of the section and repeating the molding on another section of the stator core so as to form the resin film on a whole periphery of the stator core, wherein the stator core is divided into a plurality of sections with respect to an axial center thereof.

The invention according to a second exemplary aspect includes a resin molding structure that is used to form a resin film on a surface of a stator core including a ring-shaped yoke portion, a plurality of teeth each protruding from the yoke portion in a radial direction, and a plurality of slots formed between the teeth adjacently located, wherein the resin film is formed on each of a plurality of sections of the stator core that are divided with respect to an axial center thereof and each of the resin films that are adjacently arranged are in one of a bonded state and an abutted state at a boundary between adjacently arranged resin films and the boundary passes through a center of each of the teeth in a width direction.

The invention according to a third exemplary aspect includes a mold used for resin molding where a partial molding process is performed to form a resin film on equally divided sections of a stator core with respect to an axial center thereof, a number of equally divided sections being an integer number, wherein the stator core includes a ring-shaped yoke portion, a plurality of teeth each protruding from the yoke portion in a radial direction, and a plurality of slots formed between the teeth adjacently located. The mold includes an insert die having an abutment surface in abutment on each inner peripheral surface of the teeth of the stator core, and a plurality of protrusions each protruding from the abutment surface in a radial direction such that an inner cavity is defined by the protrusions and the slots while keeping a space there between upon insertion of the protrusions into the slots and a pair of main mold bodies structured to define an end surface cavity by both end surfaces of the stator core in an axial direction while keeping a predetermined space between the cavity and each of the end surfaces, wherein the main mold bodies have end abutment portions that abut on at least one of an end surface of the stator core and a surface of the adjacent resin molding film that has been formed on one of the divided sections at both ends of the divided section in a peripheral direction so as to close the both ends of the end surface cavity in the peripheral direction.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
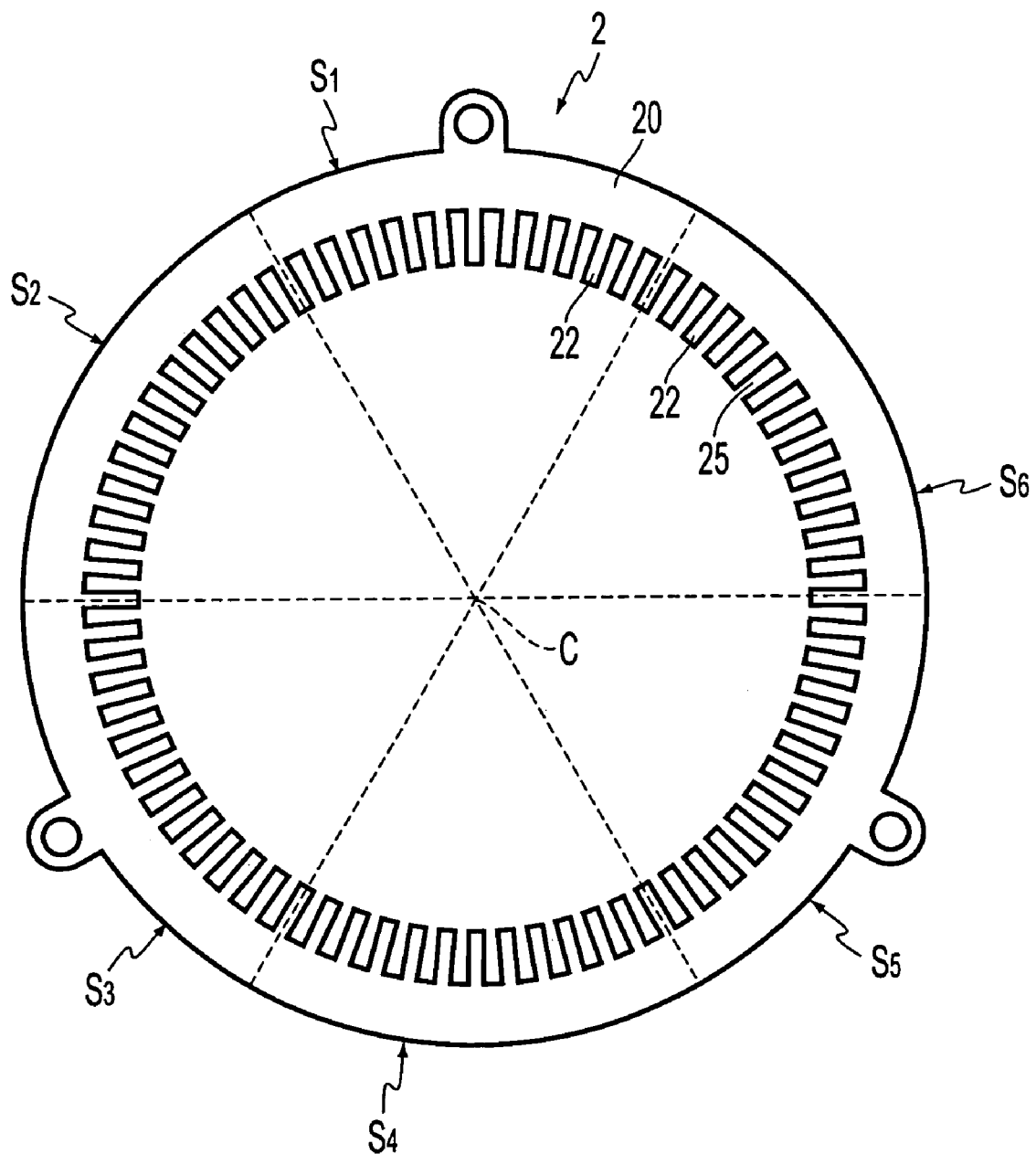
FIG. 1 is a view showing a stator core divided into a plurality of sections according to a first embodiment.

A resin molding method, resin molding structure and a mold employed for resin molding according to a first embodiment of the invention will be described referring to FIGS. 1 to 15. In this embodiment, a resin molding film 3 (FIG. 15) is formed on a surface of a stator core 2 including a ring-shaped yoke 20, a plurality of teeth 22 each protruding inward from an inner peripheral surface of the yoke 20 in a radial direction, and slots 25 each defined by adjacent teeth 22 as shown in FIGS. 1 and 15.

The stator core 2 is divided into six equal parts S (S1 to S6) with respect to an axial center C of the stator core 2. Each of the divided sections S is subjected to a partial molding process one after another such that a surface of the divided sections S is molded with a synthetic resin for forming a resin molding film 3 (3a to 3f) repeatedly. Accordingly, the whole peripheral surface of the stator core 2 is coated with the resin molding film 3.

Referring to FIGS. 3 to 10, in the partial molding process, a variable mold 4 is employed with a cavity for forming the resin molding film on each divided section S that is defined by the stator core 2 and the mold 4, and that is defined by the stator core 2, the mold 4, and the resin molding film 3 (a to f) that has been formed on the divided section adjacent to at least one side of another divided section.

Figure 3:
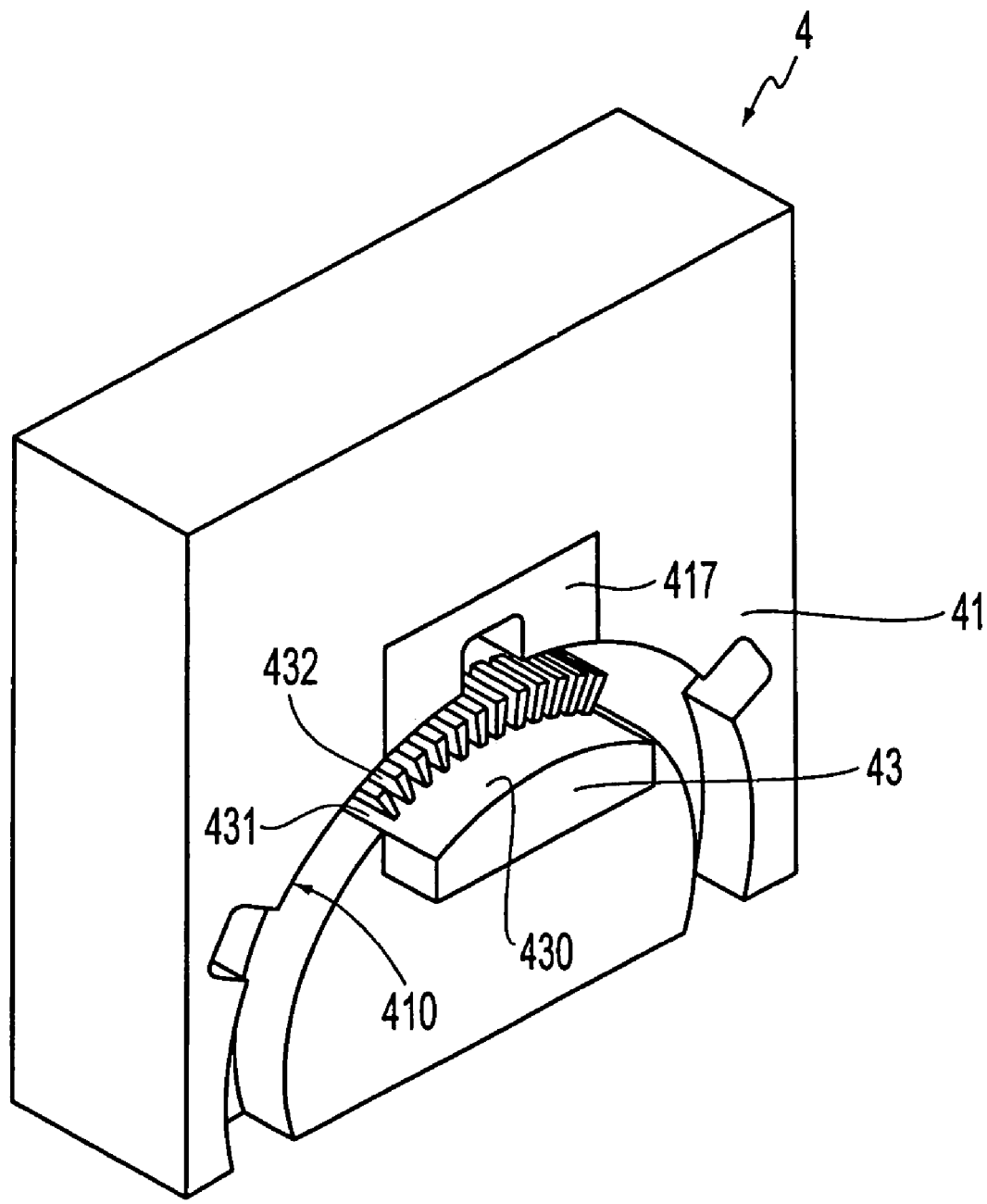
FIG. 3 is a perspective view showing a part of a variable mold according to the first embodiment.
Figure 6:
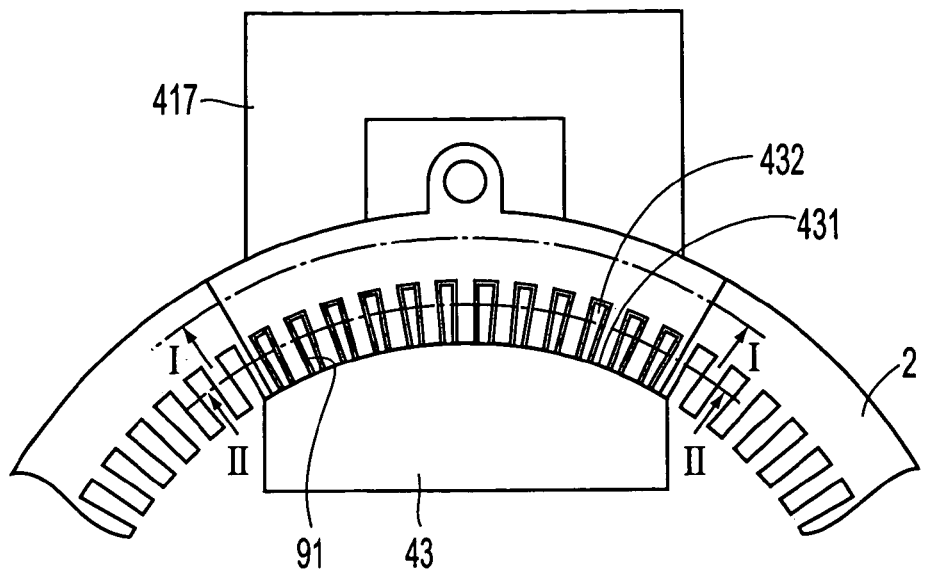
FIG. 6 is a front view showing the stator core inserted and placed into the fixed mold of the variable mold according to the first embodiment.
Figure 8:
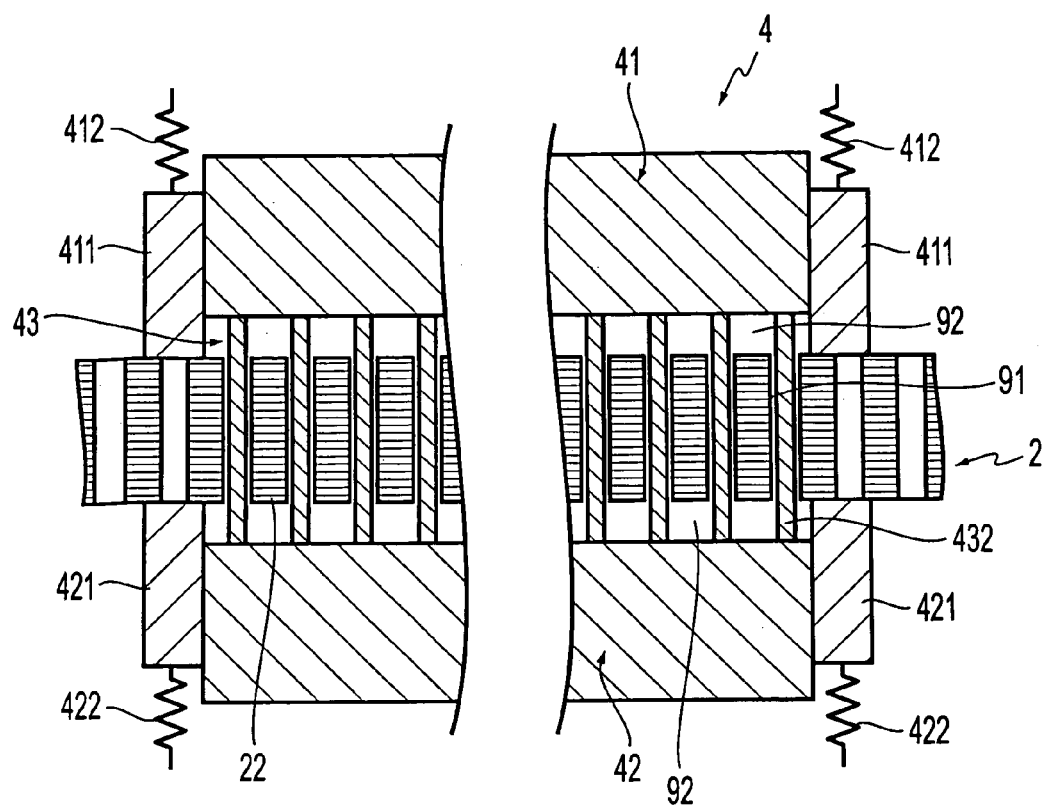
FIG. 8 shows a state where setting of the variable mold with respect to the first divided section of the stator core is completed as a sectional view taken along line II—II of FIG. 6.
Figure 9:
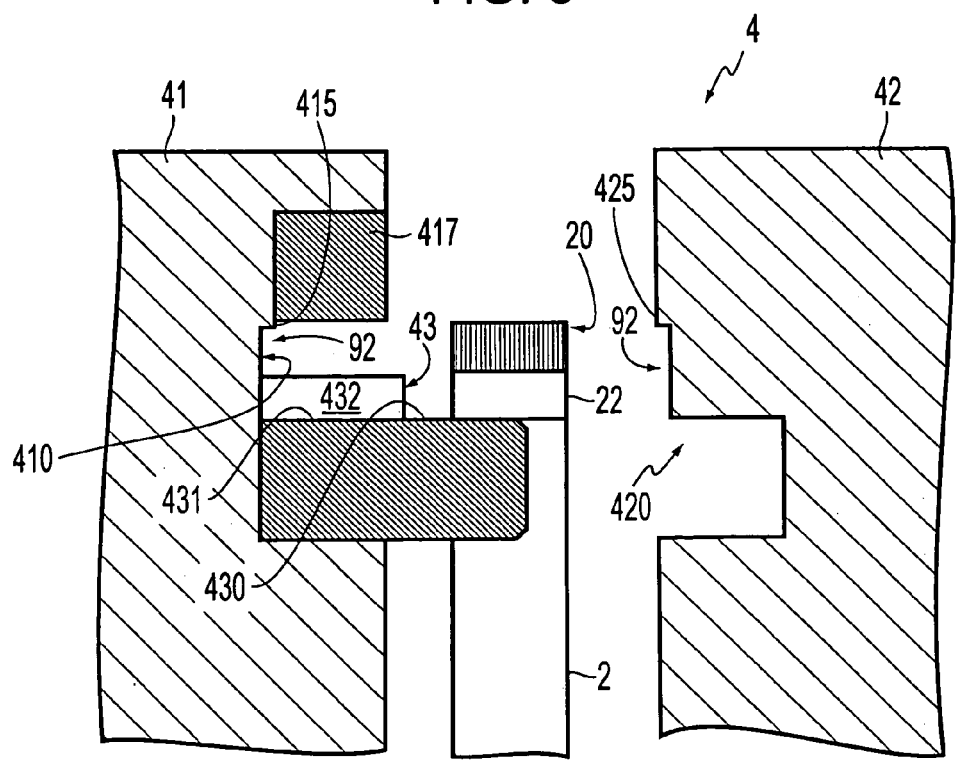
FIG. 9 is a vertical sectional view showing a state where the stator core is placed in the fixed mold of the variable mold according to the first embodiment.

As shown in FIGS. 3, 6, and 9, the variable mold 4 includes an abutment portion 431 that abuts against an inner end surface of each of the teeth 22 of the stator core 2, and a plurality of protrusions 432 each protruding from the abutment portion 431 in a radial direction. The variable mold 4 further includes an insert die 43 that is structured to form an inner cavity 91 shown in FIGS. 6, 8 and 10 such that a predetermined space is held between the protrusion 432 and the slot 25 to which the protrusion 432 is inserted. The insert die 43 includes a table portion 430 formed by extending the abutment portion 431 in the axial direction of the stator core 2 so as to simplify the insertion of the stator core 2 to be described later.

Referring to FIGS. 7 to 10, the variable mold 4 includes a pair of main molds 41, 42 that form an end surface cavity 92 having a predetermined space from the end surfaces of the stator core 2 in the axial direction. The main molds 41, 42 include end abutment portions 411, 421 each abutting on either one of the end surfaces of the divided section S of the stator core 2, or the surface of the resin molding film 3 that has been formed on the adjacent divided section S such that both ends of the end surface cavity in the peripheral direction are closed.

Referring to FIGS. 3 and 9, the main mold 41 (hereinafter referred to as a fixed mold 41) receives the insert die 43 and the stator core 2, and has a recess portion 410 that forms a cavity surface of one of the end surface cavities 92. Referring to FIGS. 3 and 6, a clamp portion 417 is provided on a top portion of the recess portion 410, which can be urged downward (from an outer side to an inner side in an axial direction of the stator core). The other main mold 42 (hereinafter referred to as a moveable mold 42) includes a cavity surface that forms the other end surface cavity 92, and a recess portion 420 that receives the insert die 43, which is structured to be moveable with respect to the fixed mold 41.

Referring to FIGS. 7, 8, 12, 14, each of the end abutment portions 411 and 421 of the fixed mold 41 and the moveable mold 42 is formed of a slide core that can be moved forward and backward between an advancement position in contact with an end surface of the stator core 2 and a reverse position in contact with the resin molding film 3 that has been already formed on the adjacent divided section S. The end abutment portions 411, 421 are urged toward the stator core 2 by springs 412, 422, respectively and then slid backward owing to repulsion.

The fixed mold 41 and the moveable mold 42 include peripheral abutment portions 415 and 425, respectively, each in abutment on the end surface of the stator core 2 on the outer periphery in the radial direction of the divided section S in order to close the outer periphery of the end surface cavity in the radial direction as shown in FIG. 9. Each of the peripheral abutment portions 415, 425 is formed into a circular shape so as to be in contact with the outer periphery of the end surface of the stator core, and configured to protrude from the cavity surface in the axial direction of the stator core 2. In this embodiment, the resin molding film 3 is formed on the whole peripheral surface of the stator core 2 by repeatedly performing the partial molding process using the variable mold 4 in the procedure to be described below.

Figure 2:
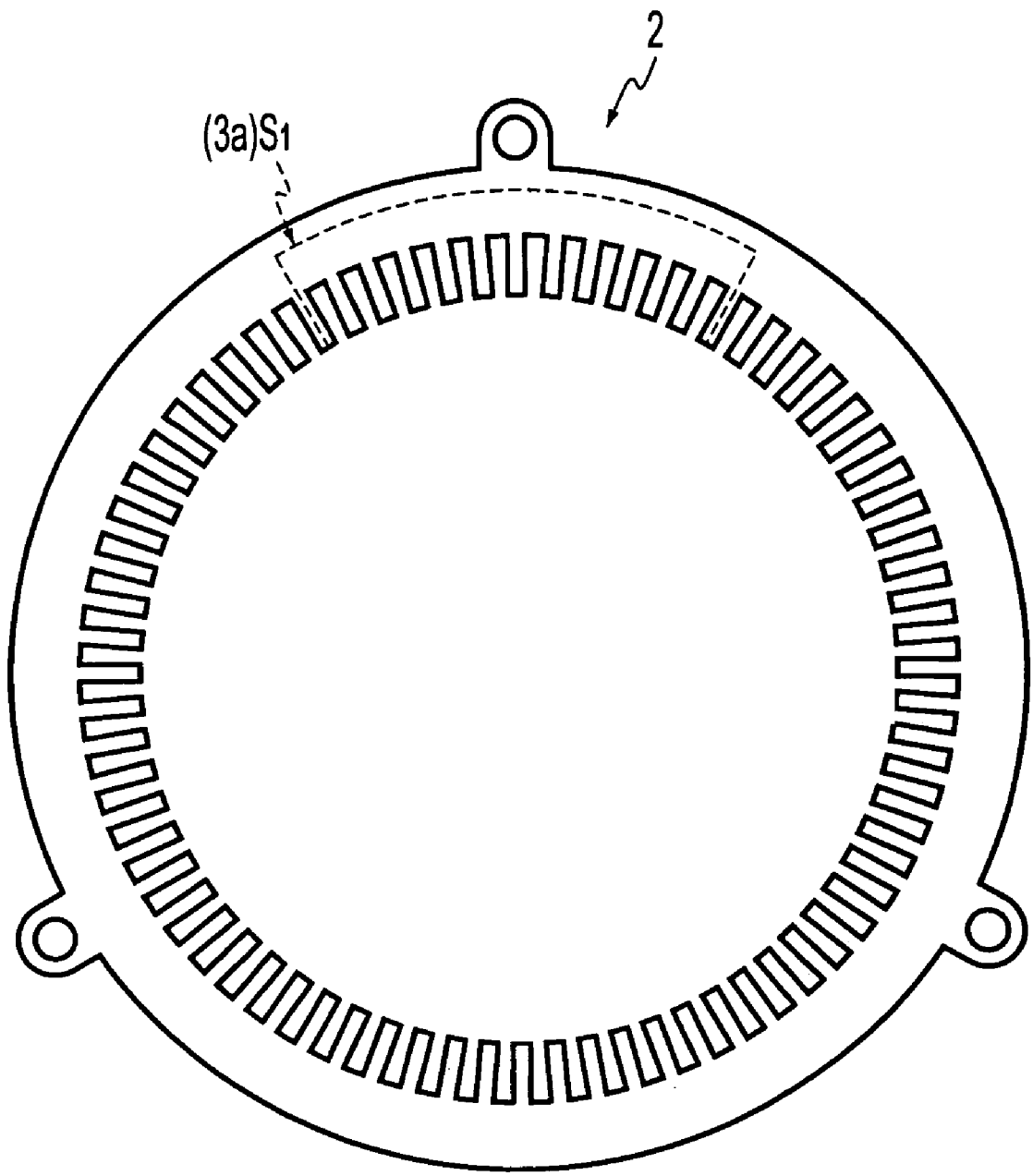
FIG. 2 is a view showing one of the divided sections of the stator core shown in FIG. 1, on which a first partial resin molding film is formed.
Figure 4:
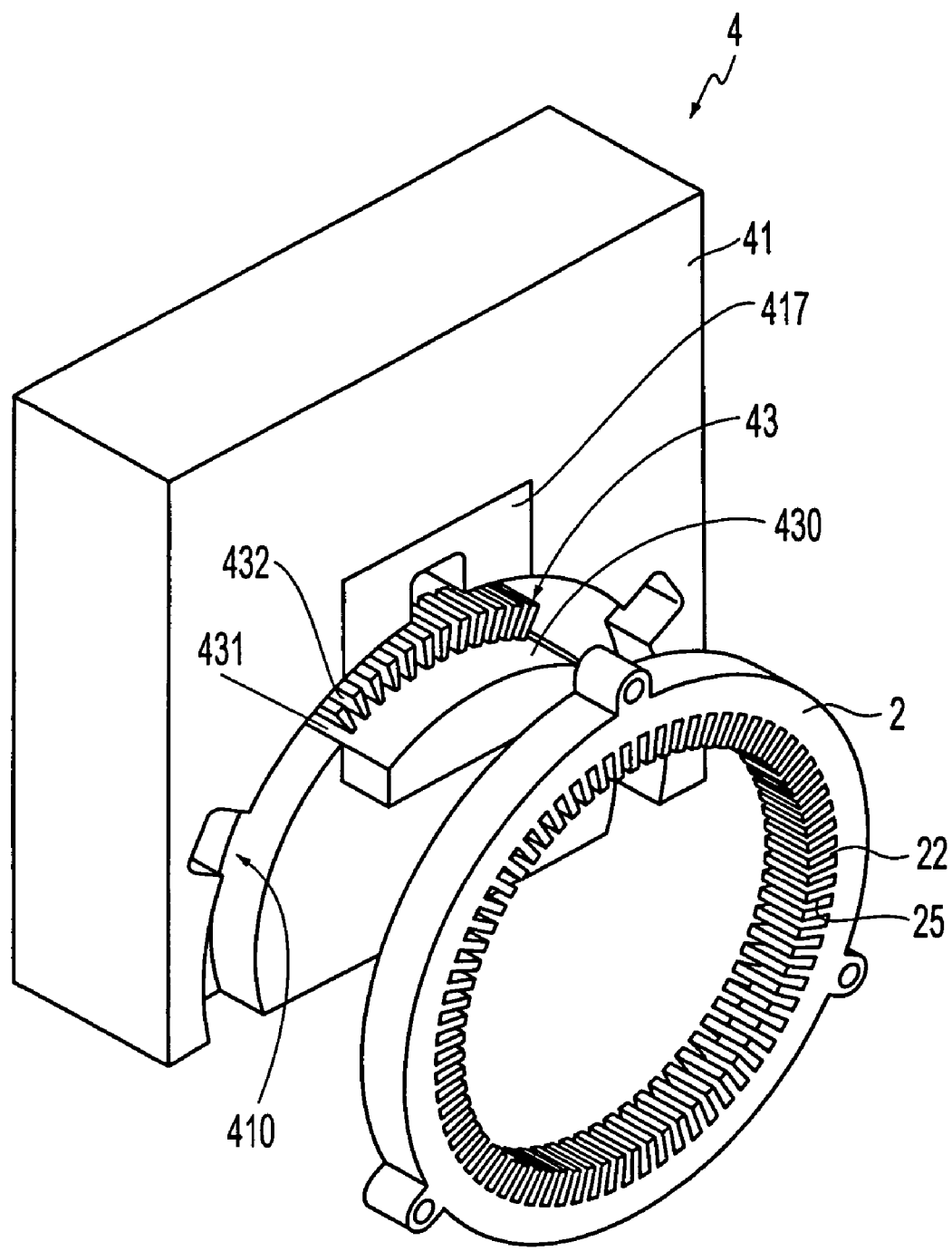
FIG. 4 is a view showing the stator core arranged to face a fixed mold of a variable mold.
Figure 5:
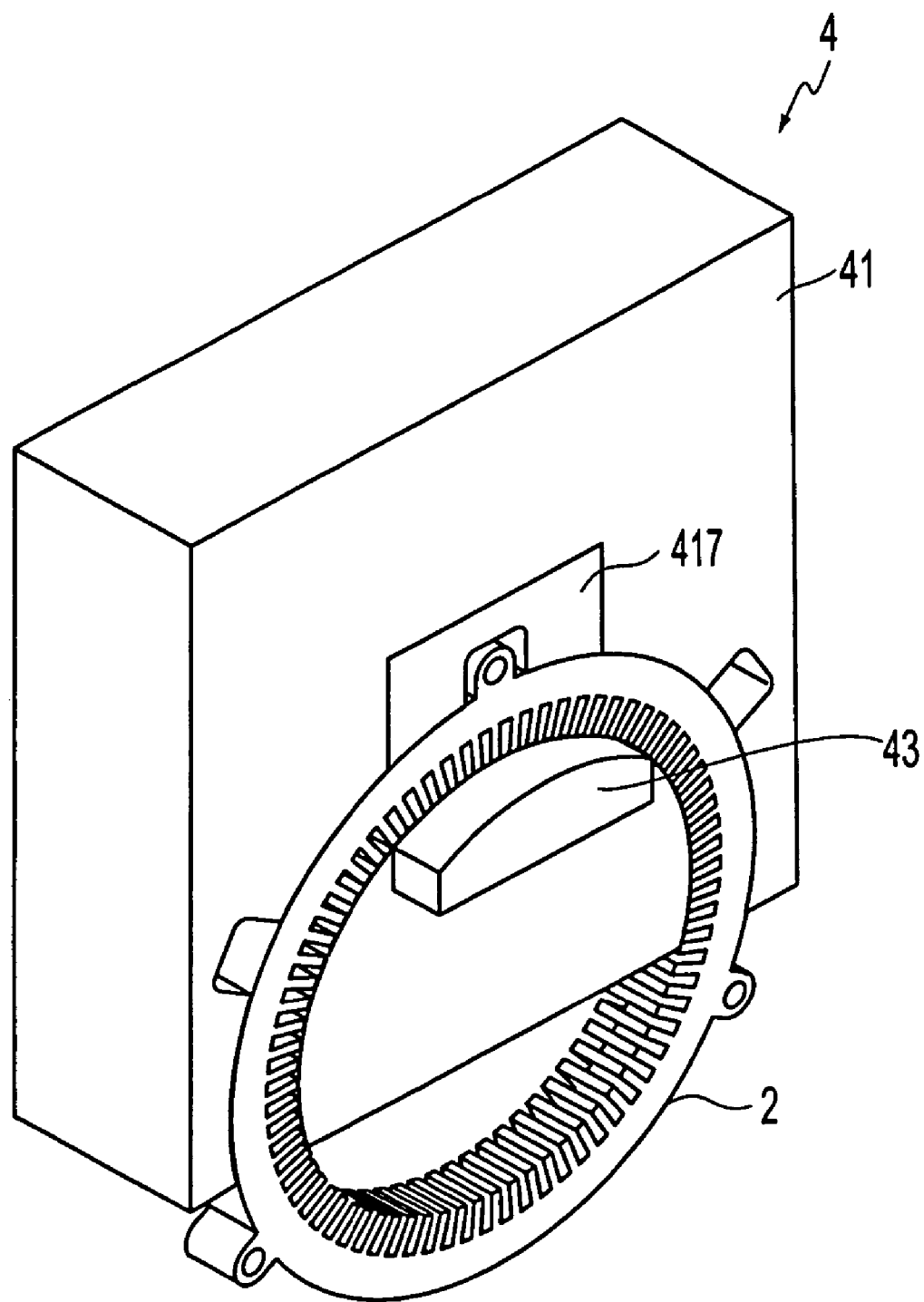
FIG. 5 is a perspective view showing the stator core inserted and placed into the fixed mold of the variable mold according to the first embodiment.

Referring to FIG. 2, the variable mold 4 is set to form the resin molding film 3 on the surface of a divided section S1 as the initial step of the partial molding process. The stator core 2 is placed to face the fixed mold 41 as shown in FIG. 4. Then, referring to FIG. 9, the stator core 2 is set on the table portion 430 of the insert die to be slid into the recess portion 410 of the fixed mold 41 as shown in FIG. 5. The stator core 2 is set such that the divided section S1 locates at the top, and the protrusion 432 of the insert die 43 is fit within the slop portion 25 of the divided section S1. Referring to FIG. 6, the clamp portion 417 of the fixed mold 41 is urged downward to fix the stator core 2. As a result, the inner cavity 91 is formed between the protrusion 432 of the insert die 43 and the inner side surface of each of the teeth 22 as shown in FIG. 6. The end surface cavity 92 is also formed between the fixed mold 41 and the end surface of the stator core 2 as shown in FIG. 10.

Figure 7:
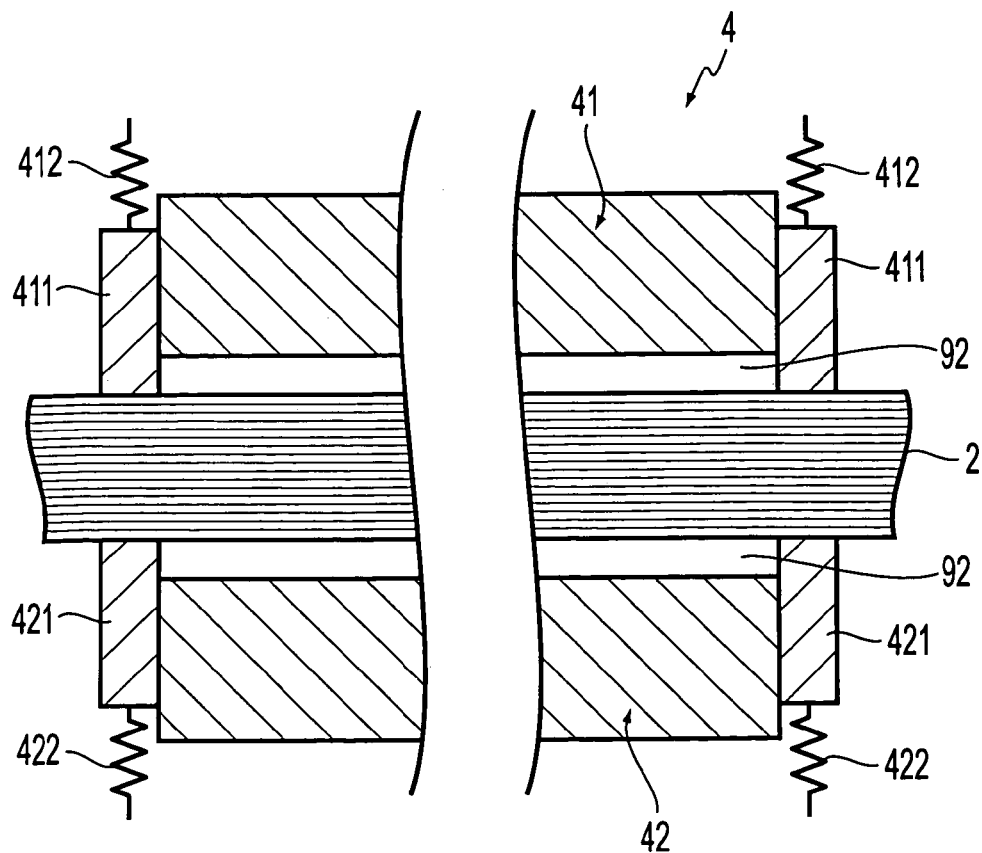
FIG. 7 shows a state where setting of the variable mold with respect to the first divided section of the stator core is completed as a sectional view taken along line I—I of FIG. 6.
Figure 10:
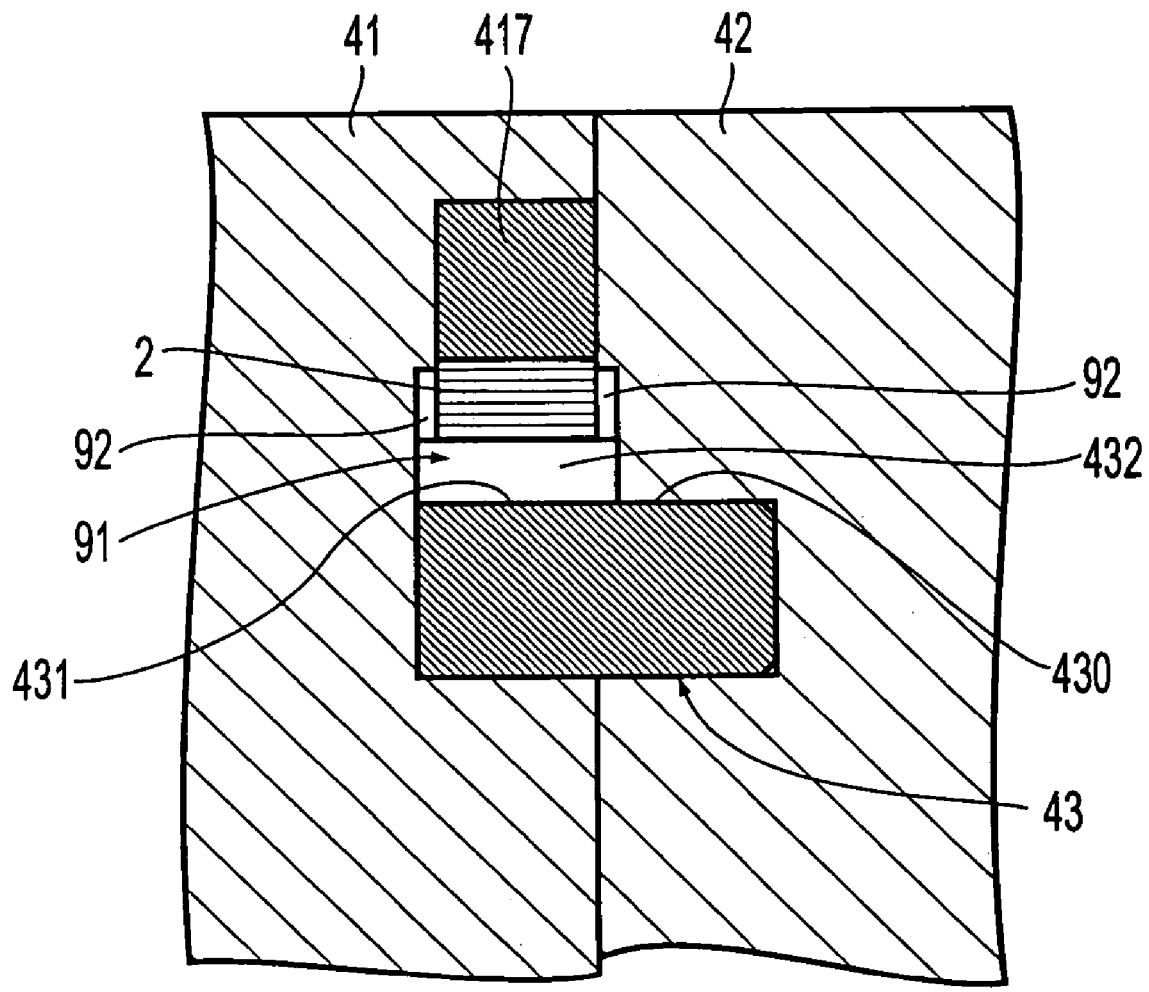
FIG. 10 is a vertical sectional view showing a state where setting of the variable mold with respect to the first divided section of the stator core is completed.

Referring to FIG. 10, the moveable mold 42 is advanced toward the fixed mold 41 so as to be brought into abutment thereon. Then as shown in FIGS. 7, 8, 10, the end surface cavity 92 is formed between the moveable mold 42 and the end surface of the stator core 2. At this time, the resin molding film 3 is not formed on the divided sections adjacent to the divided section S1 as shown in FIGS. 2, 7, and 8. Then, the end abutment portions 411 and 421 of the main molds 41 and 42 are placed in abutment on the end surface of the stator core 2 at the advancement position. In the aforementioned state, the synthetic resin material is then injected into the end surface cavity 92 and the inner cavity 91 communicated therewith through a resin injection gate (not shown). Accordingly, the resin molding film 3a is formed on the divided section S1.

Figure 11:
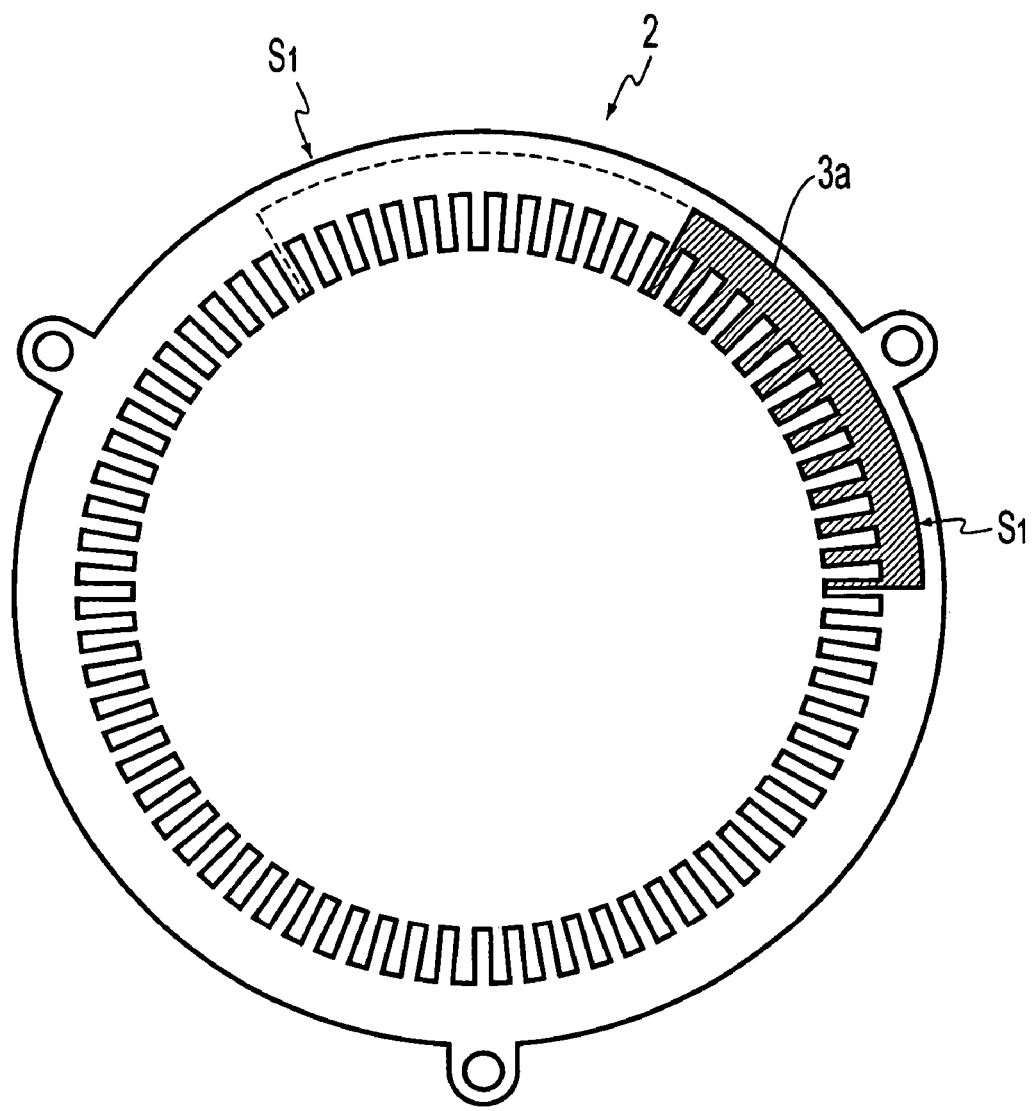
FIG. 11 is a view showing the divided section of the stator core according to a second embodiment, on which a second partial resin molding film is formed.
Figure 12:
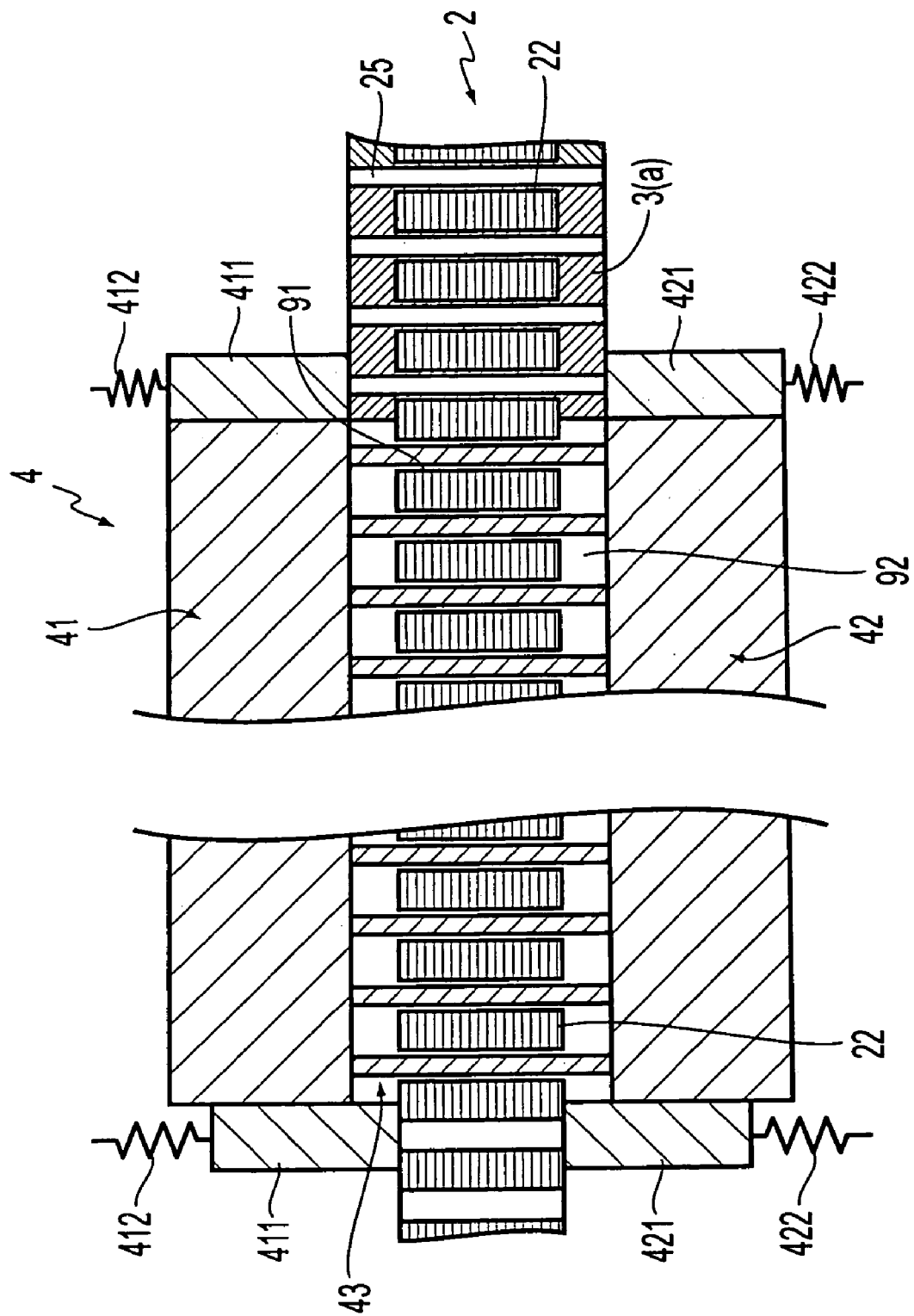
FIG. 12 shows a state where setting of the variable mold with respect to the second divided section of the stator core is completed as a sectional view taken along line II—II of FIG. 6.

In this embodiment, the variable mold 4 is then set to form another resin molding film on the divided section S2 adjacent to the divided section S1 by rotating the stator core 2 at 60° with respect to the axial center thereof as shown in FIG. 11. As the resin molding film has been already formed on the divided section S1, one of the end surface abutment portions 411, 421 of the molds 41, 42 is in the reverse position in abutment on the surface of the resin molding film 3a, and the other end surface abutment portion is in the advancement position in abutment on the end surface of the stator core 2 as shown in FIG. 12.

In the aforementioned state, the synthetic resin material is injected into the end surface cavity 92 and the inner cavity 91 communicated therewith through the resin injection gate (not shown). Accordingly, the resin molding film 3b is formed on the divided section S2. The resin molding films 3c to 3e are formed on the respective divided sections S3 to S5 in the same manner as in the case of the divided section S2 by shifting the divided section into the position for forming the resin molding film, respectively as shown in FIG. 13.

Figure 13:
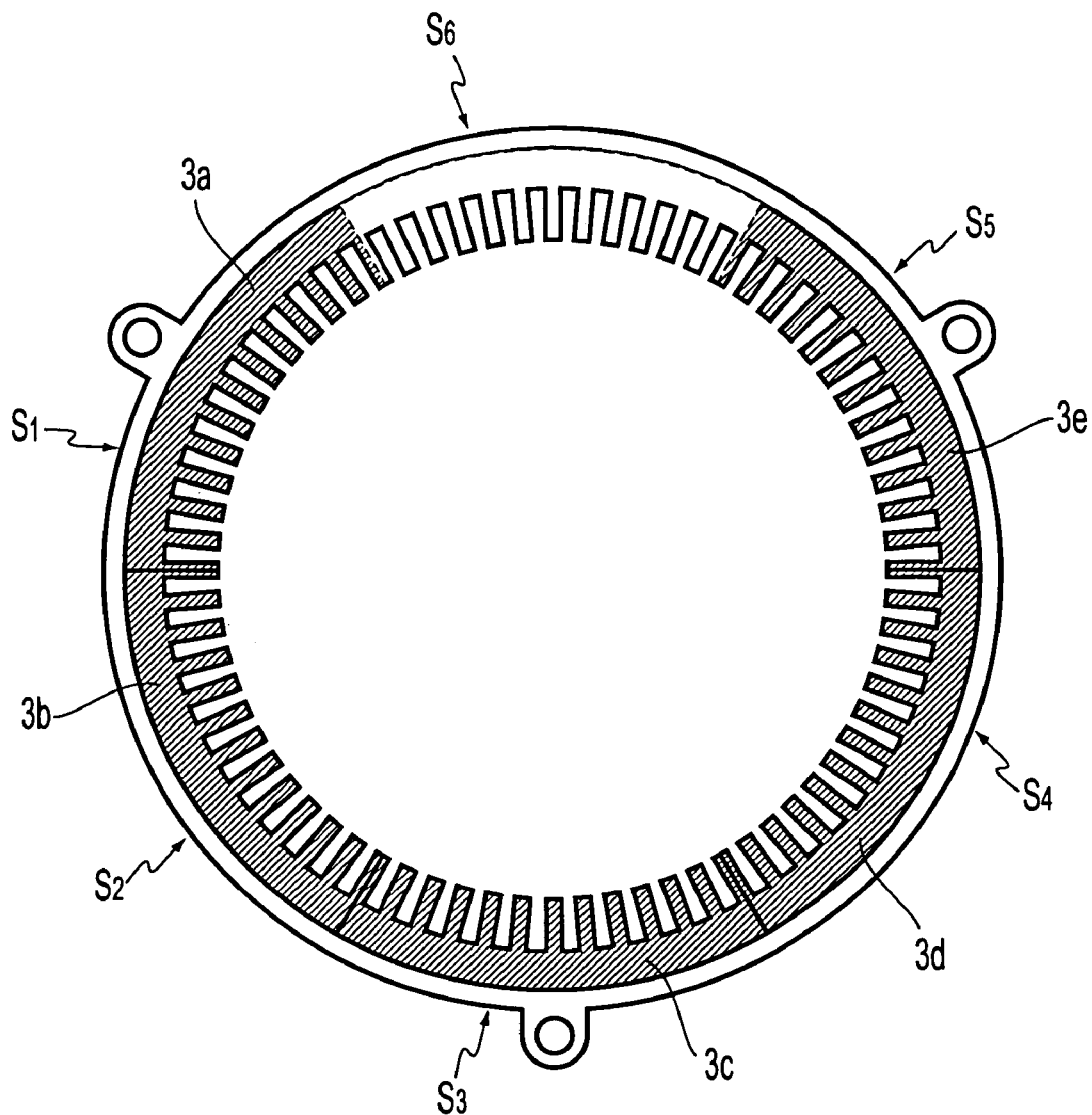
FIG. 13 is a view showing the divided section of the stator core according to the first embodiment, on which a last partial resin molding film is formed.
Figure 14:
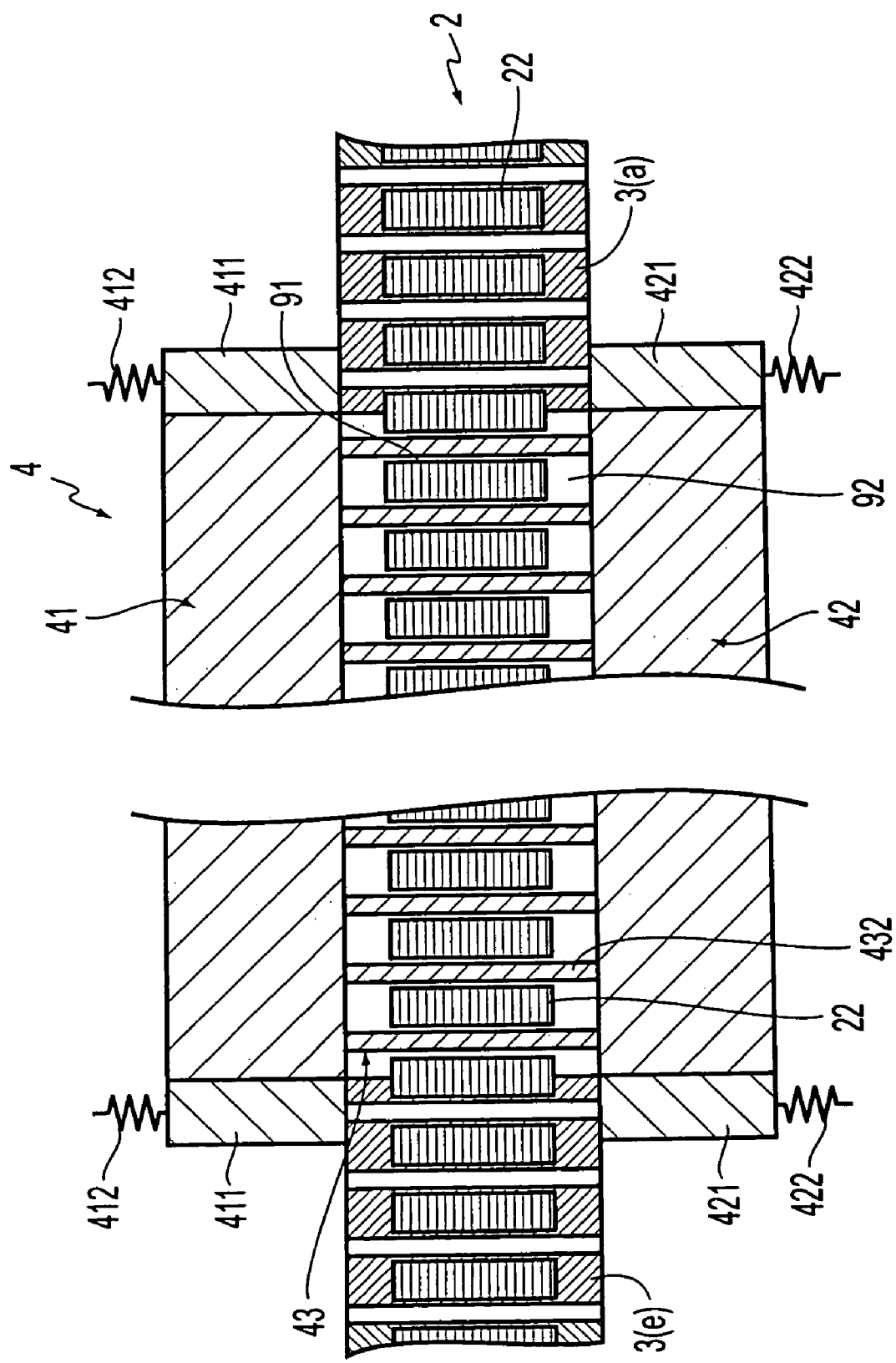
FIG. 14 shows a state where setting of the variable mold with respect to the last divided section of the stator core is completed as a sectional view taken along line II—II of FIG. 6.
Figure 15:
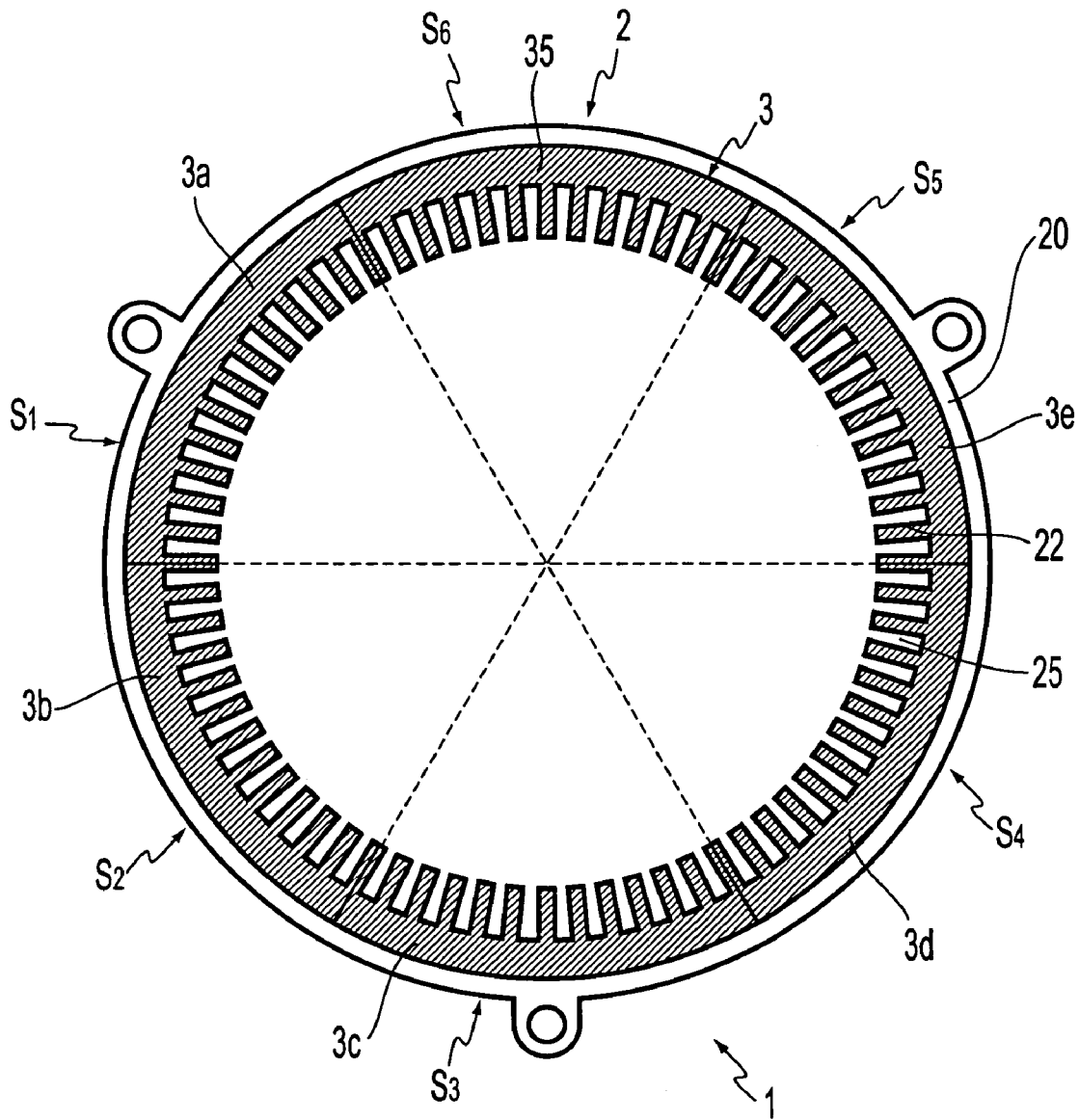
FIG. 15 shows the stator core having all the divided sections partially coated with resin molding film, which covers the whole peripheral surface to realize the insulating structure.

Finally as shown in FIGS. 13, 14, the variable mold 4 is set to form the resin molding film on the last divided section S6. As the resin molding films 3a, 3e have been already formed on the divided sections S1 and S5 adjacent to the last divided section S6, both the end surface abutment portions 411, 421 of the molds 41, 42 are in the reverse positions in abutment on the resin molding films 3a and 3e. In the aforementioned state, the synthetic resin material is injected to form the resin molding film 3f on the divided section S6. Accordingly, the resin molding film 3 is formed on the whole peripheral surface of the stator core 2 as shown in FIG. 15. The resin molding film 3 is then formed on the whole periphery of the stator core 2.

In the resin molding method according to this embodiment, the stator core 2 is divided into 6 divided sections S1 to S6 each of which is subjected to the partial molding process one after another repeatedly. As a result, the resin molding films 3a to 3f each formed on the respective divided sections S1 to S6 are formed on the whole periphery of the stator core 2. Accordingly, the portion of the surface of the stator core to be insulated can be coated with the resin molding film 3.

The partial molding process is performed with respect to the divided section one by one. This makes it possible to use a mold having a relatively smaller size as compared with the mold used for molding the whole periphery of the stator core all at once. Each of 6 divided sections S1 to S6 has an equal area to be coated with the resin molding film 3. This makes it possible to use only one type of mold, that is, a variable mold 4, thus further reducing the facility cost required for introducing an additional mold. However, as should be appreciated, any number of divided sections and molds can be used and each of the divided sections can be equal, variable or any combination thereof.

Referring to FIG. 15, in the insulating structure 1 for the stator core 2, edges of the adjacent resin molding films 3a to 3f are bonded or abutted at the respective boundaries. The boundary is set to pass over the center of each of the teeth 22 in the width direction. That is, the boundary between the adjacent resin molding films 3 does not exist within the slot 25 but exists on the surface of each of the teeth 22. This makes it possible to prevent the coil within the slot 25 from being directly in hard contact with the boundary. It is, therefore, possible to prevent a failure, for example, a split of the resin molding film 3 at the boundary, thus realizing the stable insulating structure.

A second embodiment of the invention will now be described with reference to FIGS. 16–19. In the second embodiment, a first mold 51 (FIG. 17) and a second mold 52 (FIG. 19) are employed for the resin molding method in place of the variable mold 4 in the first embodiment.

Figure 17:
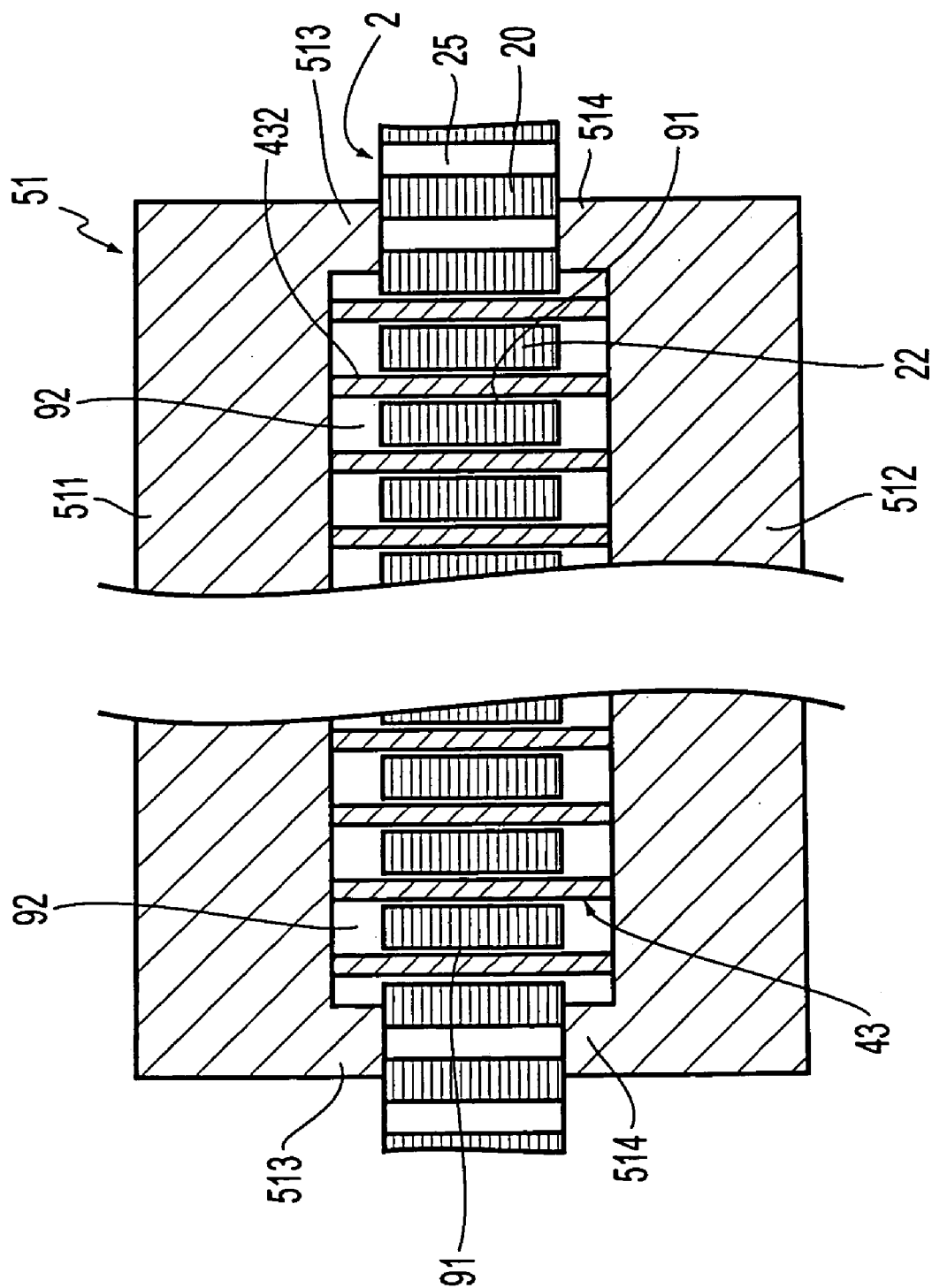
FIG. 17 shows a state where setting of a first mold with respect to the first group of the divided sections is completed as a sectional view taken along line II—II of FIG. 6 in the second embodiment.

Referring to FIG. 17, the first mold 51 includes a pair of main bodies 511, 512. The main bodies 511, 512 have end abutment portions 513, 514 each in abutment on the respective ends of the stator core 2 at both ends in the peripheral direction of the divided section. The end abutment portions 513, 514 are formed to protrude from the inner surface of the end surface cavity of the main bodies 511, 512 in the axial direction of the stator core so as to be in direct abutment on the end surface of the stator core 2.

Figure 19:
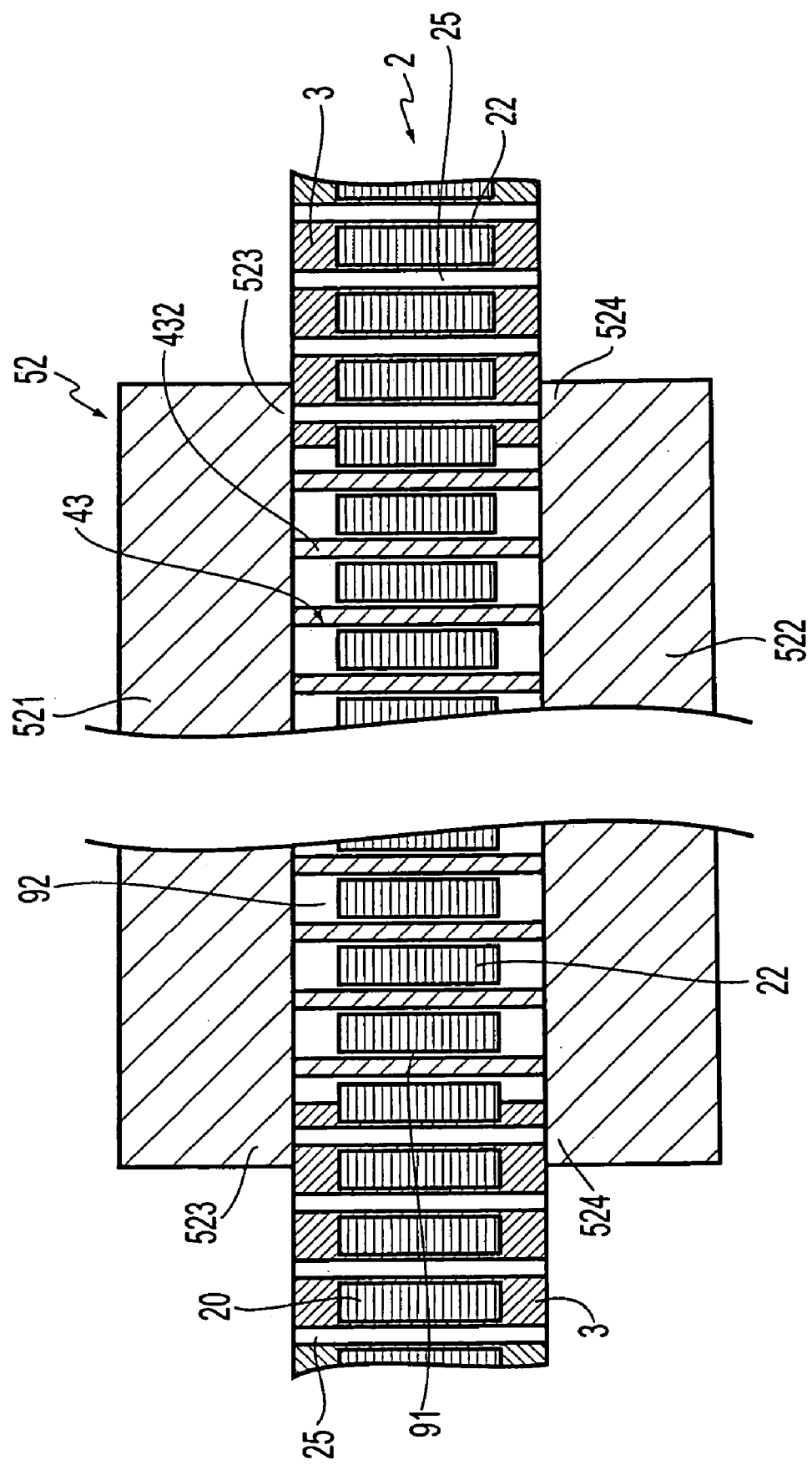
FIG. 19 shows a state where setting of the second mold with respect to the divided sections that constitute a second group is completed as a sectional view taken along line II—II of FIG. 6 in the second embodiment.

Referring to FIG. 19, the second mold 52 includes a pair of main bodies 521, 522. The main bodies 521, 522 have end abutment portions 523, 524 respectively, which are in abutment on the surface of the resin molding film 3 each formed on the adjacent divided sections S1 to S6 so as to close both ends of the end surface cavity in the peripheral direction. The end abutment portions 523, 524 are formed on the plane that is substantially the same as the inner surface of the end surface cavity 92 of the main bodies 521, 524, respectively. An insert die of the first mold 51 and other structural characteristics of this embodiment are identical to those of the variable mold 4 in the first embodiment.

Figure 16:
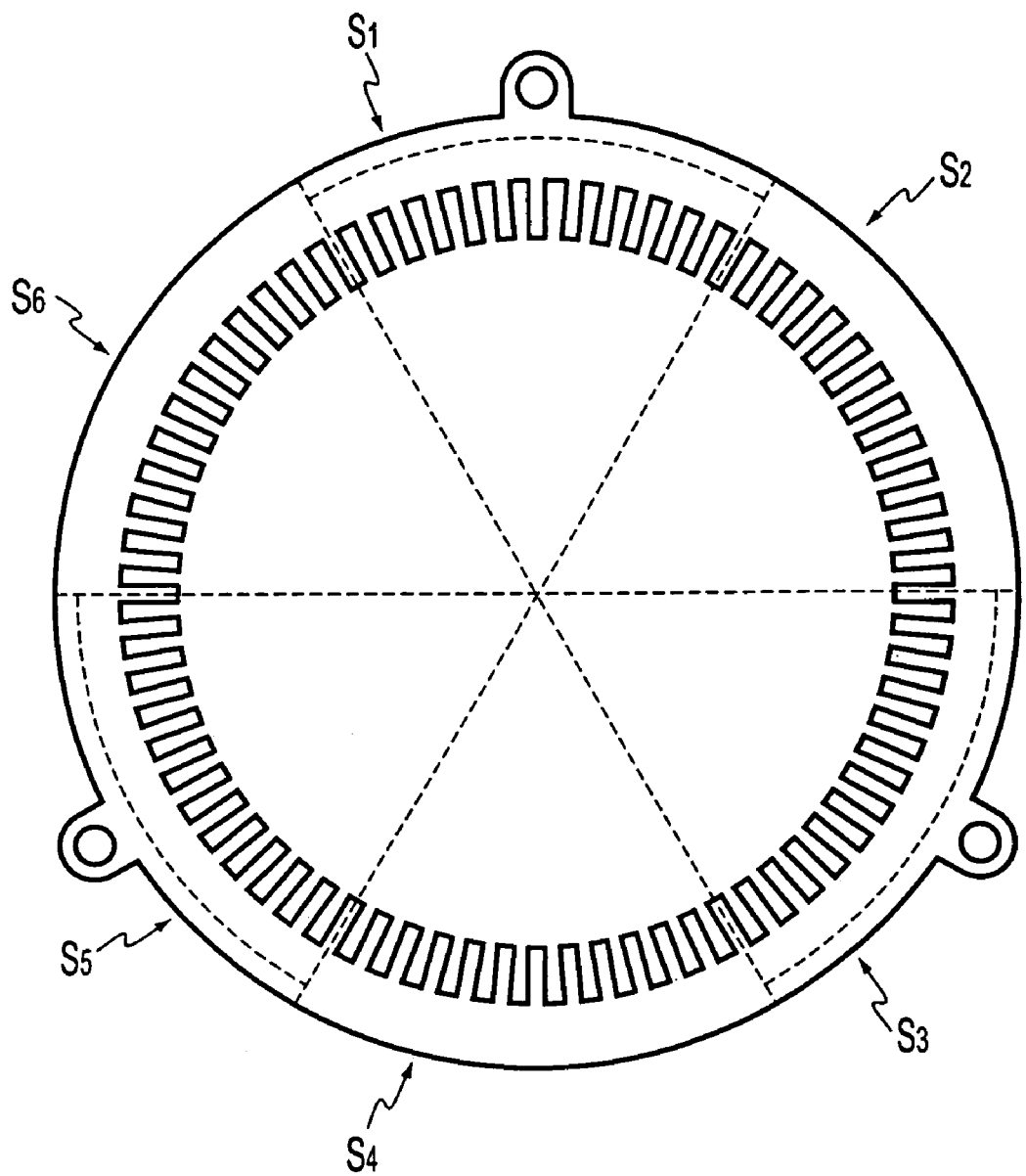
FIG. 16 shows the divided sections that constitute a first group according to the second embodiment.

The number of divided sections in the second embodiment is specified to an even number for performing the resin molding method using the above-structured first and the second molds 51, 52. In this embodiment, the number n is set to 6 in the same manner as in the first embodiment. Referring to FIG. 16, for example, the divided section S1 and those divided sections alternately arranged, that is, divided sections S3, S5 are specified as a first group. The other divided sections, that is, divided sections S2, S4, S6 are specified as a second group.

Figure 18:
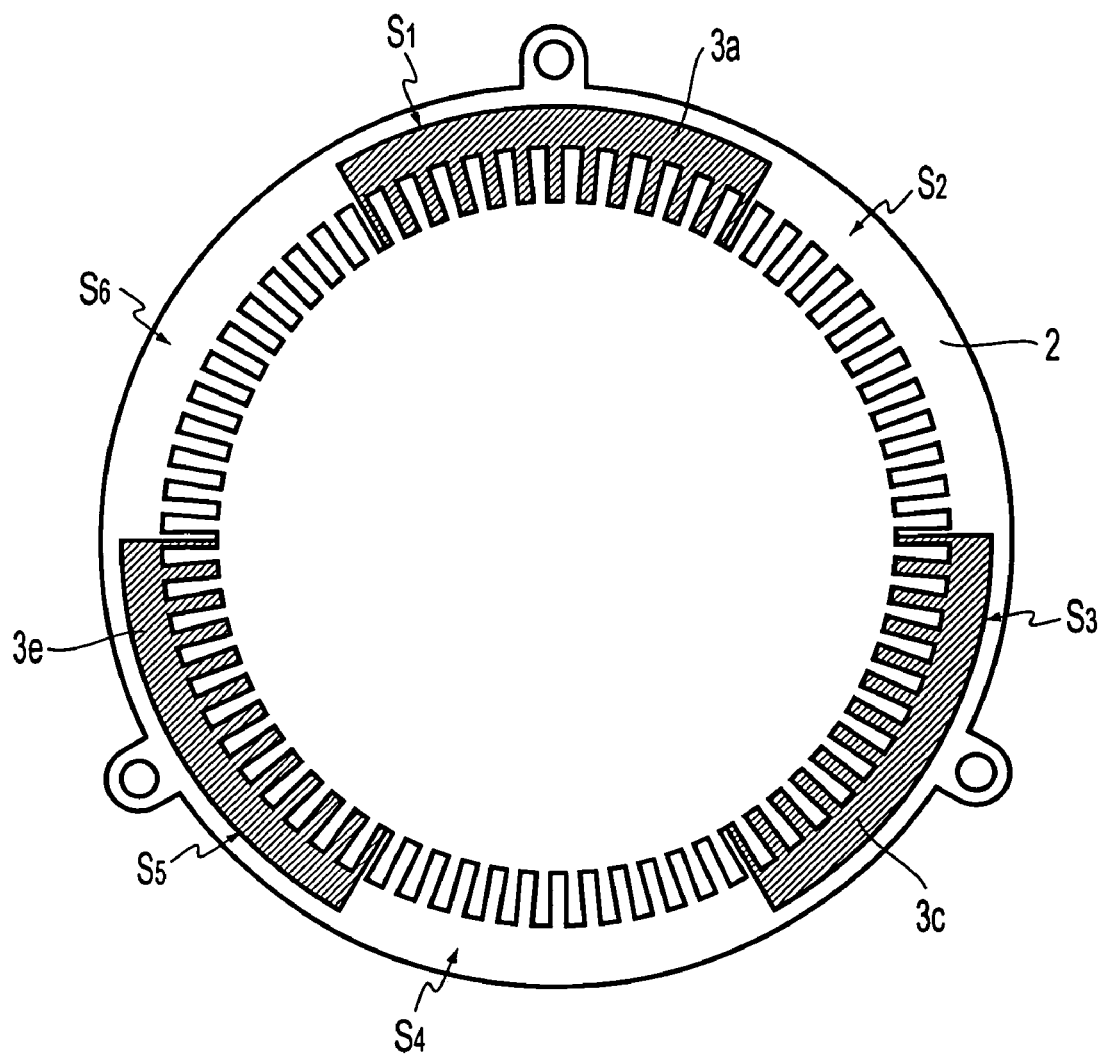
FIG. 18 shows a state where all the divided sections of the first group are coated with the partial resin molding films in the second embodiment.

Referring to FIG. 17, the first divided section group, that is, S1, S3, S5 is subjected to the partial molding process. At this time, no resin molding film is coated on the divided sections adjacent to the first group. Then the first mold 51 is used to form the cavity only by the stator core 2 and the mold. This makes it possible to form the resin molding films 3a, 3c, 3e on the divided sections S1, S3, S5, respectively as shown in FIG. 18. The order of performing the partial molding process among those divided sections S1, S3, S5 may be arbitrarily set.

Next, the partial molding process is performed with respect to the second divided section group, that is, S2, S4, S6. At this time, the resin molding films 3a, 3c, 3e have been already formed on the divided sections adjacent to those of the second divided sections as shown in FIG. 19. Then the second mold 52 is used to form the cavity by the stator core 2, the mold 52, and the resin molding film 3 by performing the partial molding process. In the aforementioned case, the order of performing the partial molding process among those divided sections S2, S4, S6 may be arbitrarily set.

The resin molding films 3b, 3d, 3f are formed on the respective divided sections S2, S4, S6 of the second group through the partial molding process. As a result, the resin molding film 3 is formed on the whole periphery of the stator core 2 in the same manner as in the first embodiment (FIG. 15).

In the second embodiment, two types of molds, that is, the first mold 51 and the second mold 52 are used to perform the partial molding process with respect to the divided sections S1 to S6. Other functional effects obtained by this embodiment are the same as those obtained by the first embodiment.

Figure 20:
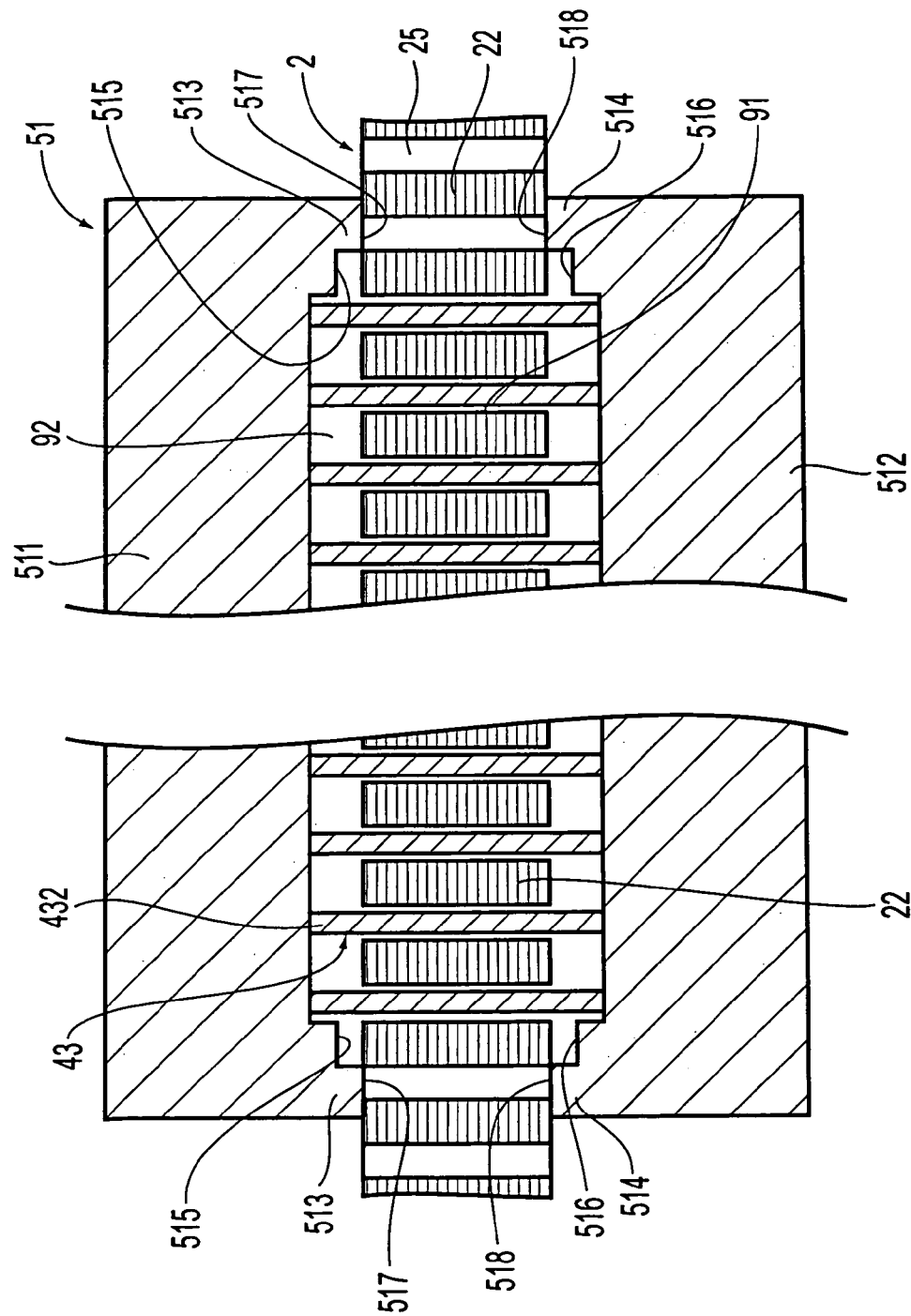
FIG. 20 shows a state where setting of the first mold with respect to the divided sections of the first group is completed as a sectional view taken along line II—II of FIG. 6 in a third embodiment.

A third embodiment of the invention will now be described with reference to FIGS. 20–22. Referring to FIG. 20, the mold used in this embodiment is obtained by modifying the configuration of the first mold 51 used in the second embodiment. More specifically, stepped portions 515, 516 are formed on intermediate portions of the end abutment portions 513, 514 each protruding from the inner surface of the end surface cavity. Those stepped portions 515, 516 are formed to face the end surface of the stator core 2 at a position farther away from the stator core 2 than the contact surfaces 517, 518 of the end surface abutment portions 513, 514.

Figure 21:
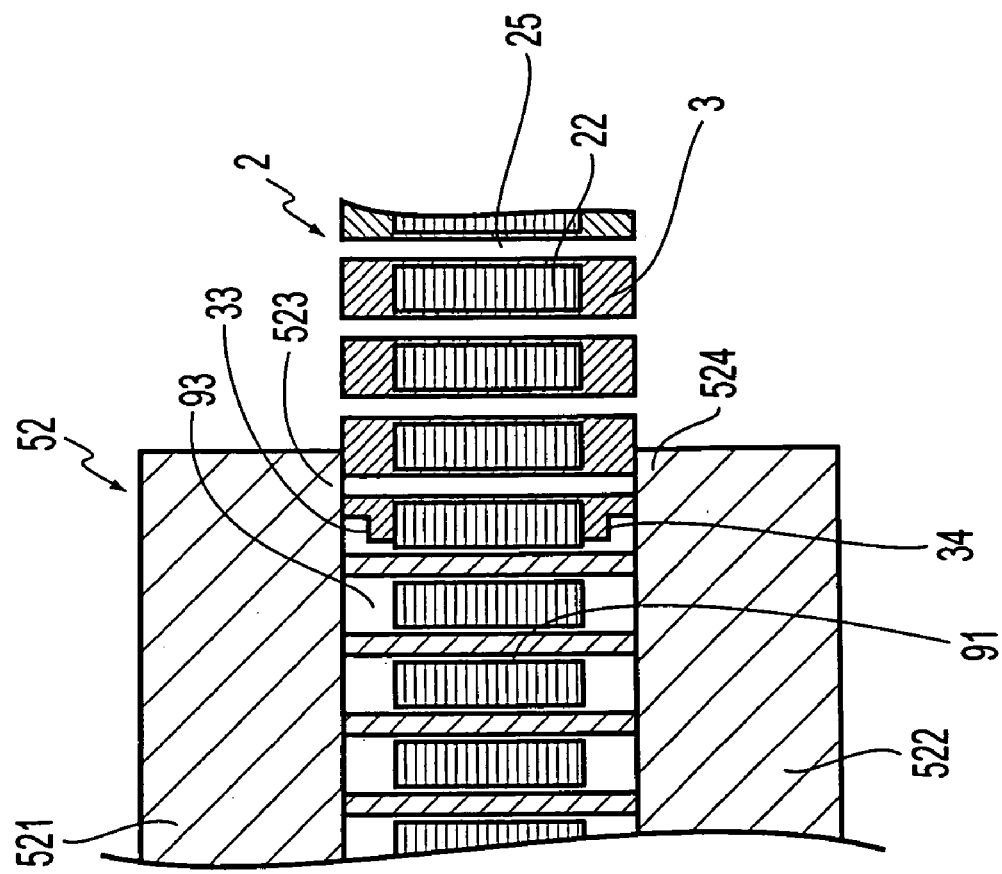
FIG. 21 shows a state where setting of the second mold with respect to the divided sections of the second group is completed as a sectional view taken along line II—II of FIG. 6 in the third embodiment.
Figure 21:
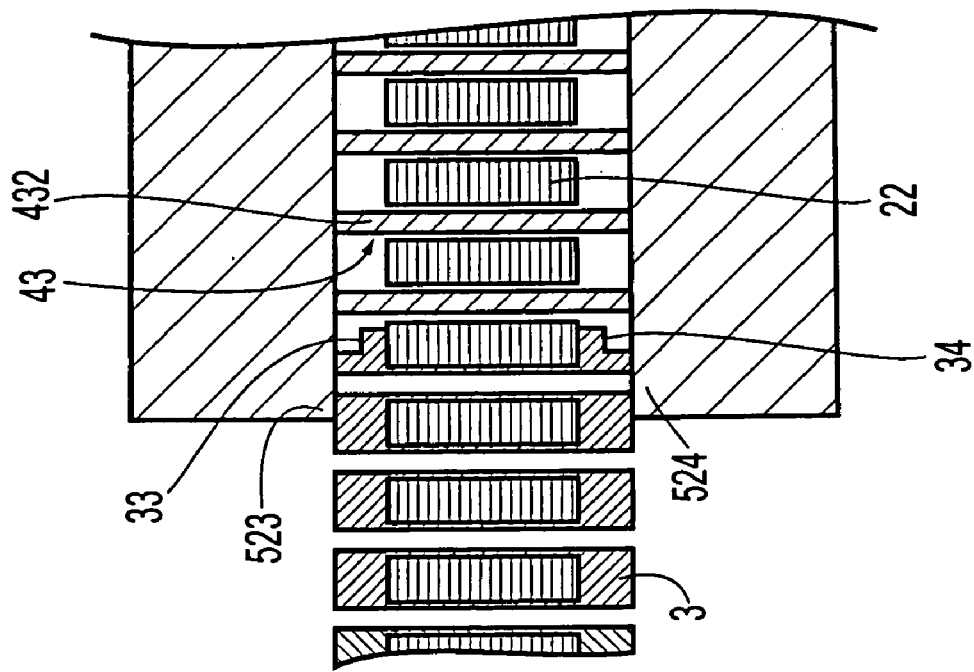
Figure 22:
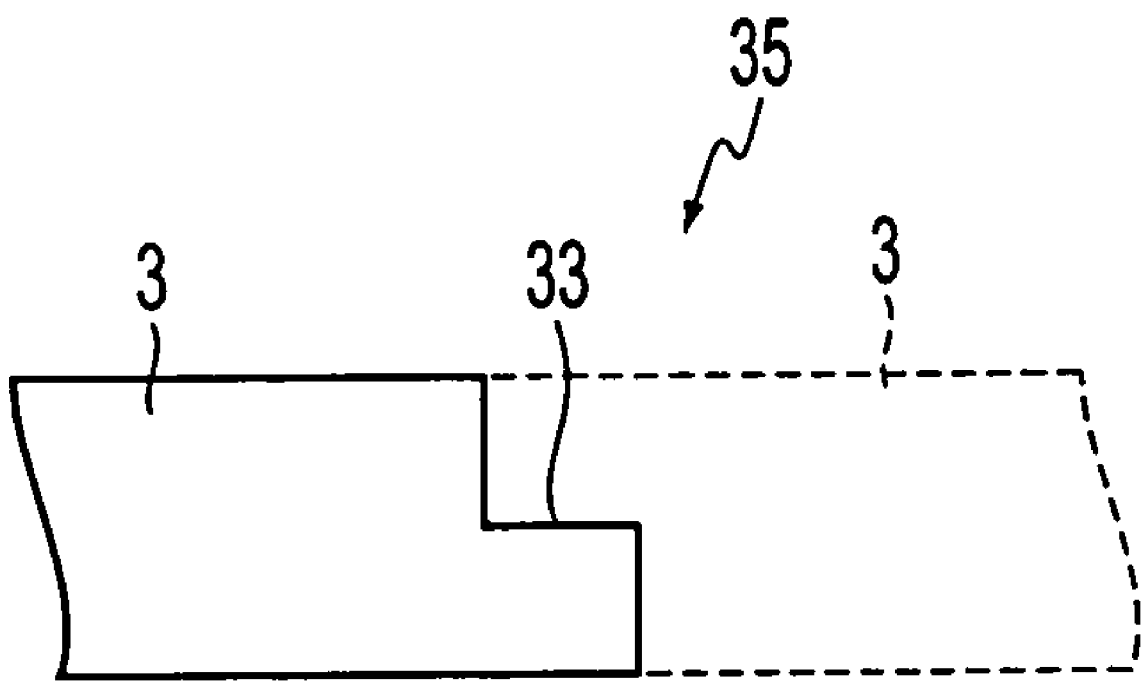
FIG. 22 shows a portion where adjacent partial resin molding films overlap at a boundary therebetween in the third embodiment.

Referring to FIGS. 21, 22, each end of the resin molding film 3 has a stepped surface 33 corresponding to the stepped portions 515, 516. As shown in FIG. 21, the second mold 52 identical to the one in the second embodiment is used to perform the partial molding process in the same manner as the second embodiment. Then the end portion of the resin molding film 3 to be formed thereafter is set so as to cover the stepped surfaces 33, 34.

Referring to FIGS. 21, 22, an overlapped portion 35 of at least a portion of end surfaces of the resin molding films 3 is formed at the boundary between adjacent resin molding films 3. The contact area of the end surfaces between adjacent resin molding films 3 is increased to improve the anchor effect. This makes it possible to enhance the bonding strength between the adjacent resin molding films 3. Other characteristics of the third embodiment are the same as those of the second embodiment.

A fourth embodiment of the invention will now be described with reference to FIGS. 23–24. In a fourth embodiment, a single base mold 50 having a replaceable portion is employed so as to function as both the first mold 51 and the second mold 52 in the second embodiment as shown in FIGS. 23, 24.

More specifically, each end surface abutment portion of the main molds 501, 502 of the base mold 50 is made replaceable so as to allow attachment of either a first end surface abutment portion 551 or a second end surface abutment portion 552 each having a different configuration. The other characteristics of the base mold 50 such as the insert die and other portions are identical to those of the first embodiment.

Figure 23:
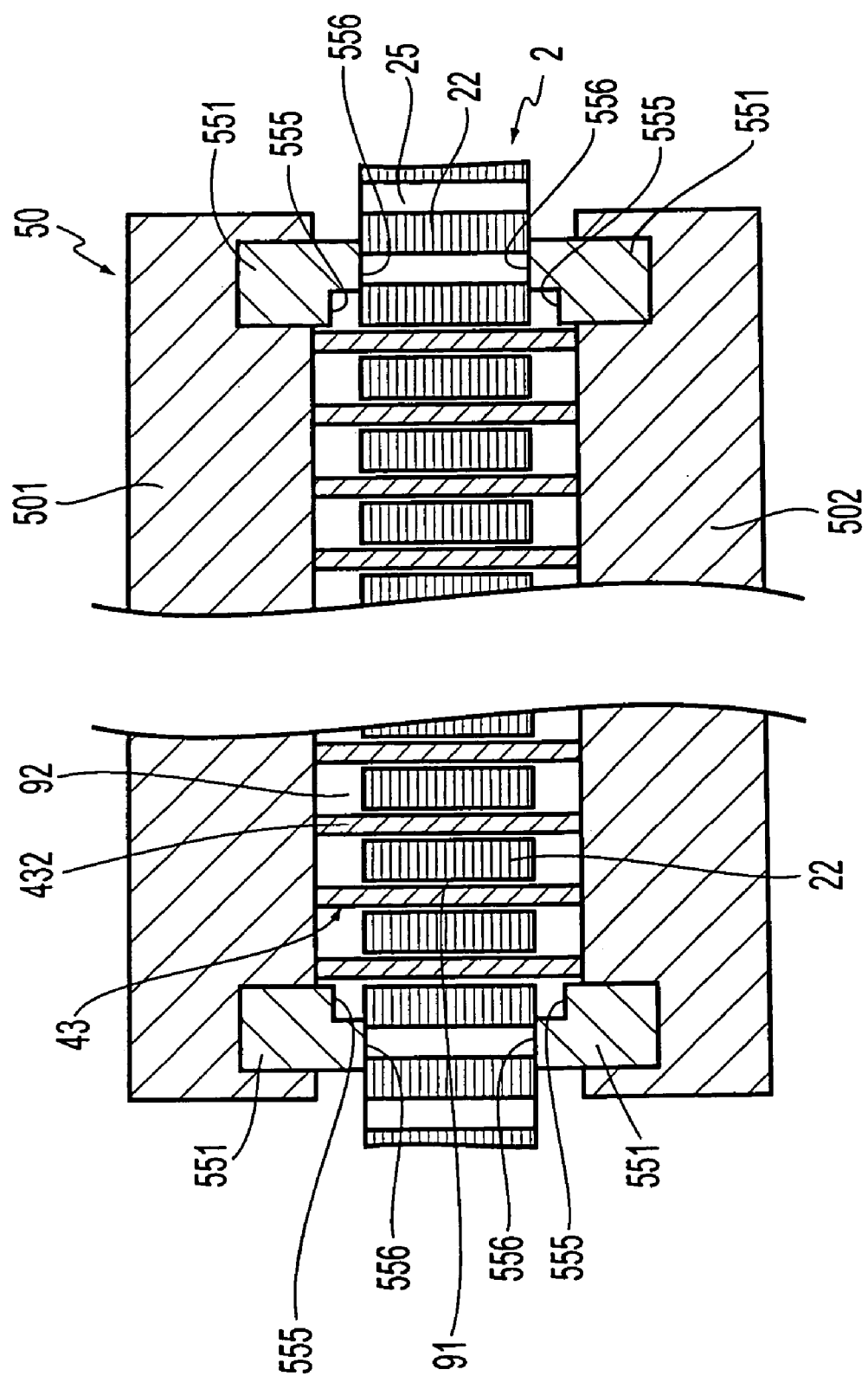
FIG. 23 shows a state where setting of a base mold attached to a first end abutment portion with respect to the divided sections of the first group is completed as a sectional view taken along line II—II of FIG. 6 in a fourth embodiment.
Figure 24:
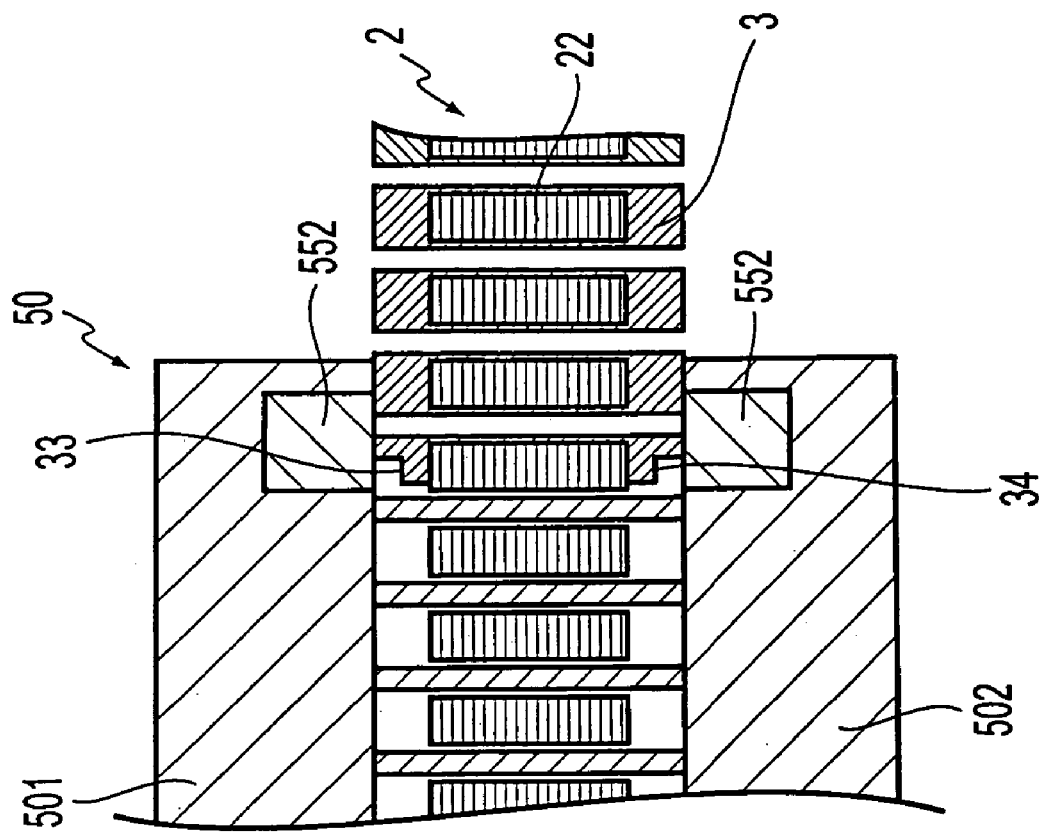
FIG. 24 shows a state where setting of the base mold attached to the first end abutment portion with respect to the divided sections of the second group is completed as a sectional view taken along line II—II of FIG. 6 in the fourth embodiment.
Figure 24:
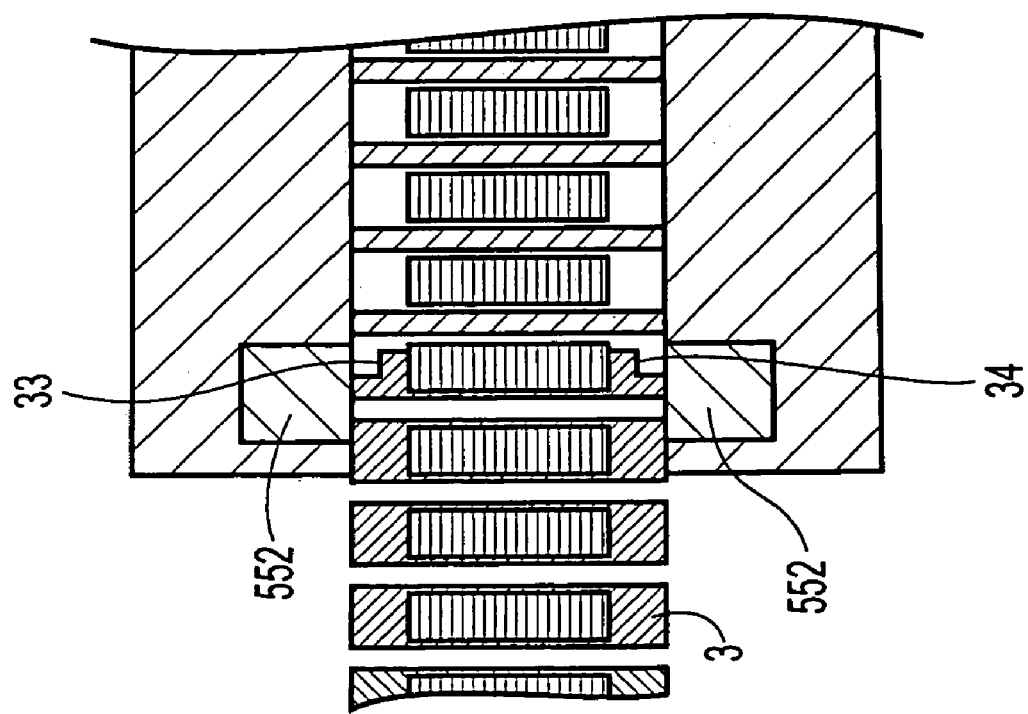

In the resin molding method using the aforementioned base mold 50, the first end surface abutment portion 551 is attached to both main molds 501, 502 of the base mold 50 as shown in FIG. 23. In this embodiment, the first end surface abutment portion 551 is provided with a stepped portion 555 that faces the end surface of the stator core 2 at a position retracted from the stator core farther than a contact surface 556 in direct abutment on the end surface of the stator core 2.

The base mold 50 to which the first end surface abutment portion 551 has been attached is employed to perform the partial molding process with respect to the first divided section group, that is, divided sections S1, S3, S5, respectively in the same manner as in the second embodiment shown in FIG. 18.

Referring to FIG. 24, the second end surface abutment portion 552 is attached to the base mold 50 such that the second divided section group, that is, divided sections S2, S4, S6 are subjected to the partial molding process, respectively. The second end surface abutment portion 552 has an abutment surface on the same plane as the cavity surface likewise the second mold 52 in the second and the third embodiments.

The partial molding process is further performed with respect to three divided sections S2, S4, S6 using the base mold 50 to which the second end surface abutment portion 552 has been attached. This makes it possible to form the resin molding film 3 on the whole peripheral surface of the stator core 2 as shown in FIG. 15.

In this embodiment, the single base mold 50 is capable of realizing two different types of functions by changing the replaceable portion, thus reducing the cost for the mold. Likewise the third embodiment, the overlap portion 35 as shown in FIG. 22 is formed owing to the stepped portion 555 in this embodiment. This makes it possible to enhance the bonding strength of the boundary between adjacent resin molding films 3. Other characteristics of this embodiment are identical to those of the second and the third embodiments.

Figure 25:
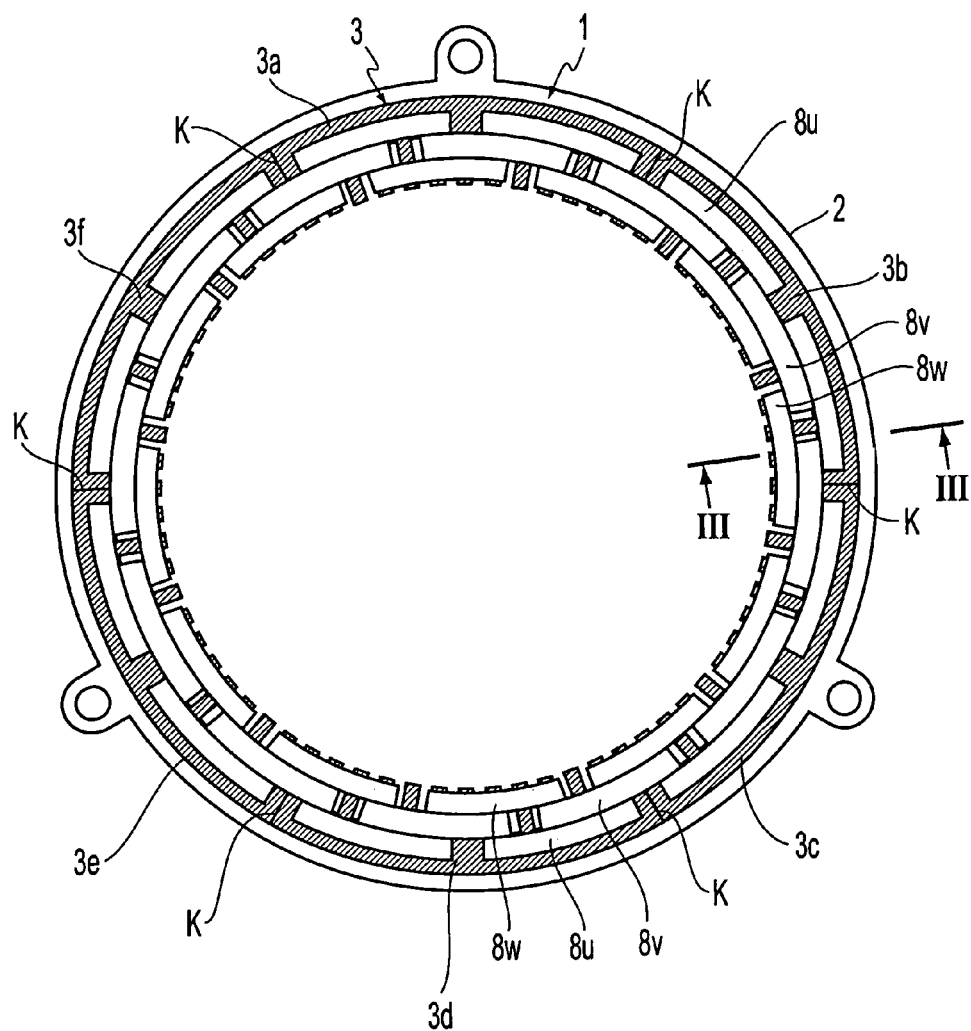
FIG. 25 shows the stator core provided with three-phase coils in layers in accordance with a fifth embodiment.
Figure 26:
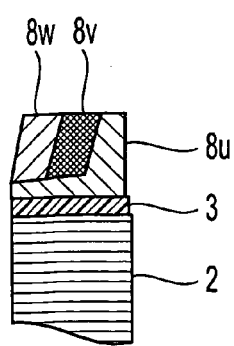
FIG. 26 is a partly sectional view taken along line III—III of FIG. 25.

A fifth embodiment of the invention will now be described with reference to FIGS. 25–27. In this embodiment, coils each having the insulating structure as described in the first embodiment are attached to the stator core 2 as shown in FIG. 25. Referring to FIG. 25, the stator core 2 in the fifth embodiment may be used for a 3-phase brushless motor, which allows three coils 8u as U-phase, 8v as V-phase, and 8w as W-phase to be attached in layers.

In this embodiment, there are 72 slots 25 formed in the stator core 2 such that 12 single way coils for the three respective phases, that is, 36 single way coils in total can be attached. As shown in FIG. 25, the coil ends of the coils 8u as the U-phase are attached to locate at the most outer periphery of the stator core 2, then the coil ends of the coils 8v as the V-phase are attached to the inner side of the coil ends of the coils 8u. The coil ends of the coils 8w as the W-phase are attached to the inner side of the coil ends of the coils 8v.

The coil end portion of each of the coils 8 extending to the end surface of the stator core 2 is arranged to be closer to the outer peripheral side for avoiding an increase in the axial dimension of the stator core 2, and is set in abutment on the end surface. The coil ends of the coils 8u as the U-phase each being vertically bent from the slots 25 at the edge surface of the stator core 2 are deformed toward the outer periphery so as to be arranged along the peripheral direction. The coil ends of the coils 8v and 8w as the V-phase and the W-phase are attached to the coil ends of the coil 8u as the U-phase from the inside.

Figure 27:
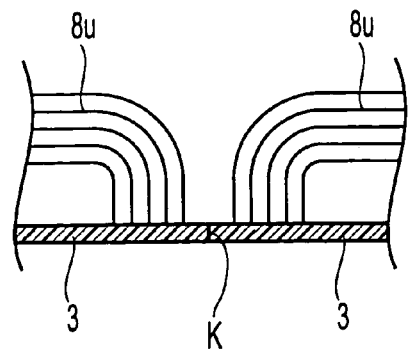
FIG. 27 shows the boundary of the resin molding film interposed between the coils of phase U in the fifth embodiment.

In this embodiment, referring to FIGS. 25, 27, each boundary K between adjacent resin molding films among 3a to 3f is set at a position between the adjacent coils 8u as the U-phase arranged at the most outer periphery of the stator core 2.

This makes it possible to prevent the coils 8u arranged at the most outer periphery of the stator core 2 from being in contact with the boundary, further avoiding the failure such as split of the resin molding film 3 on the boundary.

Figure 28:
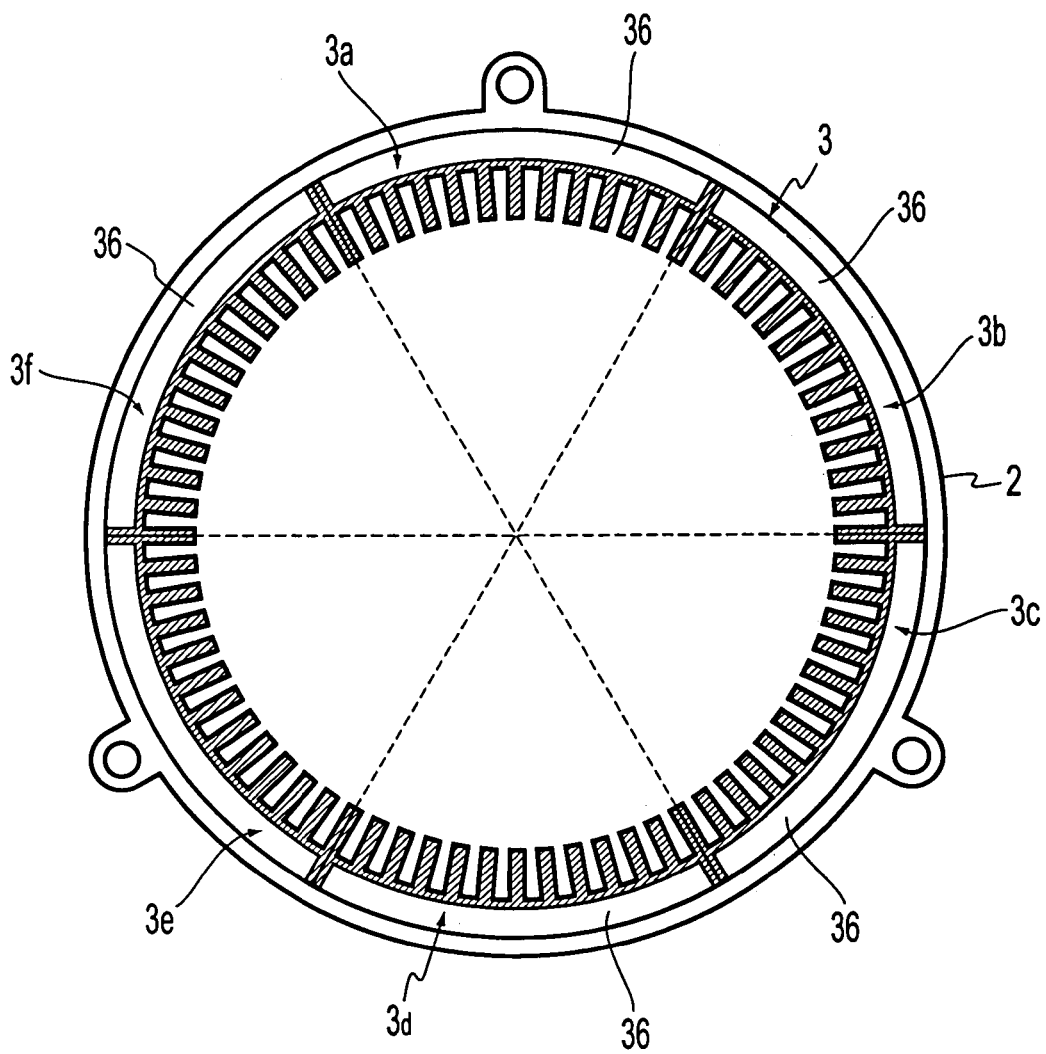
FIG. 28 shows the stator core in which a portion with a reduced thickness is formed in the resin molding film in the fifth embodiment.
Figure 29:
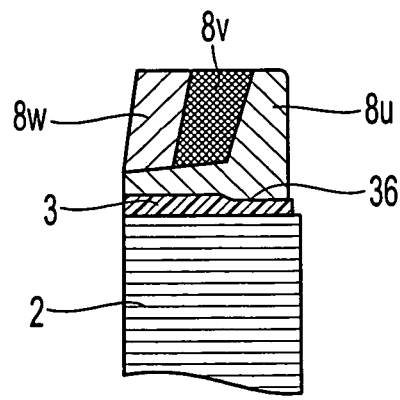
FIG. 29 is a sectional view of the portion with the reduced thickness of the resin molding film in the fifth embodiment.

A sixth embodiment of the invention will now be described with reference to FIGS. 28–32. In a sixth embodiment, the configuration of the resin molding film 3 described in the first and the fifth embodiment of the invention is modified as shown in FIGS. 28, 29. More specifically, a thickness of a portion of the resin molding film 3 that has been formed on the yoke portion 20 at both end surfaces of the stator core 2 is reduced. Such reduced thickness portion 36 has a thickness smaller than that of the resin molding film 3 that has been formed on the teeth 22. In this embodiment, the reduced thickness portion 36 is formed on the resin molding films 3a to 3f formed on the respective divided sections S1 to S6.

In the aforementioned case, referring to FIG. 29, each of the coil ends of the coils 8u as the U-phase at the most outer periphery is set on the end surface of the stator core 2 under pressure so as to face the aforementioned reduced thickness portion 36. This makes it possible to provide a space to receive the coil ends extending from the stator core 2 to the end surface side, further reducing the axial dimension of the stator core.

Figure 30:
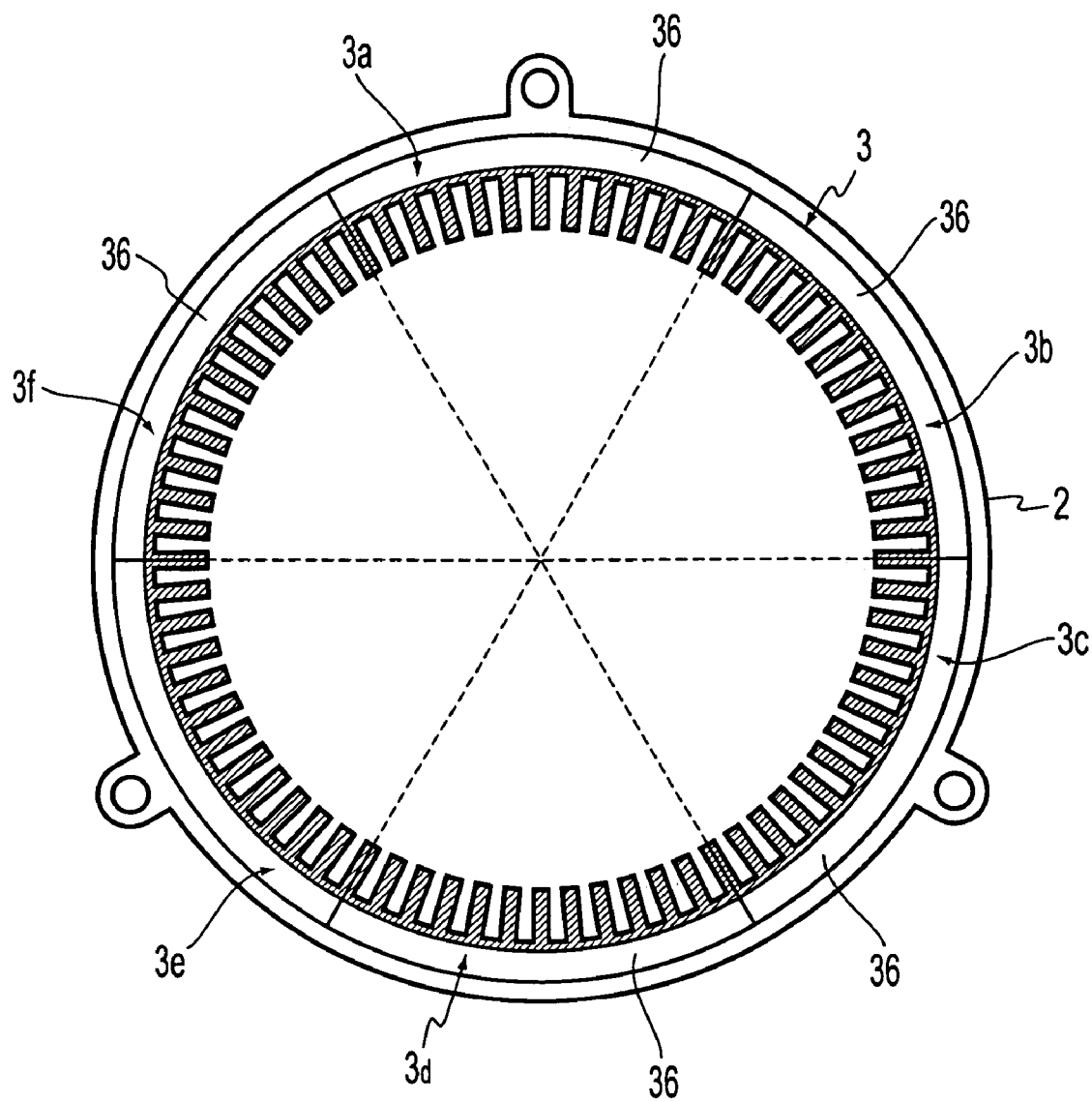
FIG. 30 shows an another type of the stator core in which the portion with reduced thickness is formed in the resin molding film.
Figure 31:
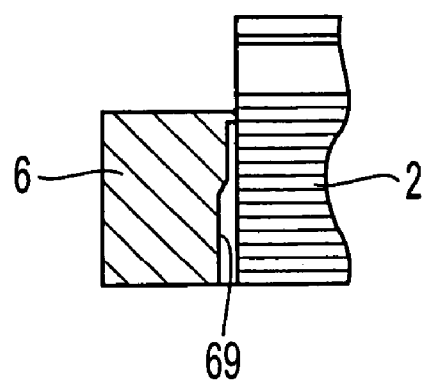
FIG. 31 is a partly sectional view of the mold for forming the resin molding film with the portion with reduced thickness in the fifth embodiment.

Referring to FIG. 30, the reduced thickness portions 36 may be formed into a ring over the whole periphery of the stator core 2 by changing the cross sectional shape of he cavity surface 69 of the end surface cavity of a mold 6 as well as the end surface abutment portions and the like as shown in FIG. 31.

Figure 32:
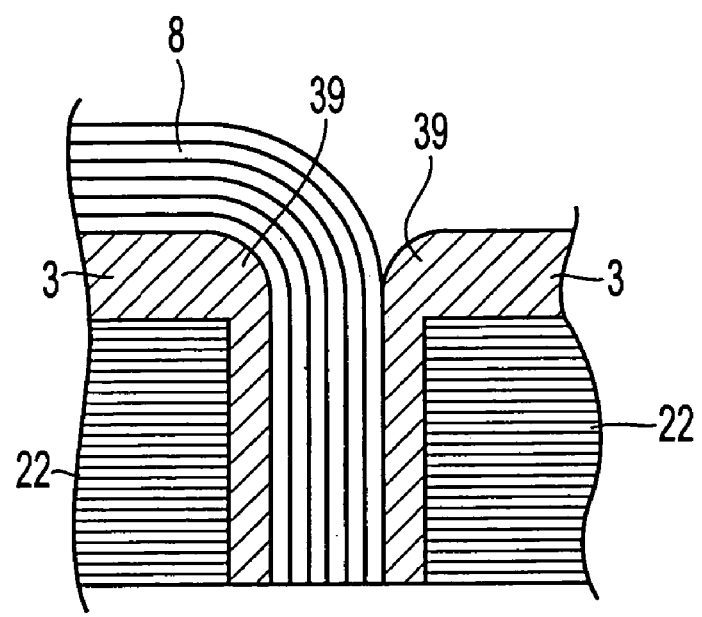
FIG. 32 is a view showing a configuration of a corner portion of the resin molding film that covers teeth of the stator core.

In this embodiment, as shown in FIG. 32, a corner portion 39 that covers the teeth 22 of the resin molding film 3 is formed into an R-shape having a predetermined curvature. This makes it possible to prevent the coil 8 from being damaged when it is bent along the teeth 22. The R-shape of the resin molding film 3 may be applied to all the other embodiments as aforementioned.

According to a first exemplary aspect of the invention, the stator core is divided into n divided portions. Each divided portion is then repeatedly subjected to a partial molding process. Each resin molding film formed on the respective divided portions is connected in order to be continuously formed on the entire peripheral surface of the stator core. This makes it possible to form the resin molding film over the whole surface of the stator core that is to be insulated.

The aforementioned partial molding process may be performed with respect to only a single divided portion. As such, the size of the mold used for the partial molding process may be reduced as compared with the size of the mold used for molding the entire stator core at the same time. As each of the divided portions has an equal area to be coated with the resin molding film, either one type or two types of the mold may be required. This makes it possible to further reduce the facility cost for introducing the mold.

In the aforementioned resin molding method, the stator core is divided into a plurality of divided portions, and each of the divided portions is subjected to the partial molding process. This makes it possible to easily form the resin molding film on the relatively large sized stator core as compared with the resin molding method that has been generally employed.

According to a second exemplary aspect of the invention, the resin film is formed on each of the divided portions. Such resin film is continuously connected so as to form the resin film on the whole peripheral surface of the stator core. The resin molding method including the aforementioned partial molding process makes it possible to form the resin molding film even on the large-sized stator core.

Each boundary between adjacent resin molding films is set so as to pass through substantially the center of a tooth portion in a width direction. That is, the boundary between the adjacent resin molding films is not formed within the slot portion but on the surface of the tooth portion. This may prevent the coil placed within the slot from being directly in hard contact with the boundary, thus avoiding the failure caused around the boundary at which the resin molding film splits. This makes it possible to realize a more stable insulating structure.

According to a third exemplary aspect of the invention, the mold includes at least an insert die and a pair of main bodies. Those parts are combined to define an inner cavity and an end surface cavity communicated therewith such that the partial molding process is performed.

The structure or the configuration of the end abutment portion may be modified. The mold may be structured to be used for the partial molding process with respect to all the divided sections. Alternatively the mold may be structured to be used for the partial molding process with respect to specified divided section or sections only.

According to the first exemplary aspect of the invention, the partial molding process may be performed with respect to all the divided sections using the first mold and the second mold. That is, all the n divided sections (n: even number) are split into a first group having the divided sections alternately arranged and a second group having the other divided sections.

The partial molding process is performed with respect to the divided sections of the first group. At this time, as the resin molding film is not formed, the first mold is used to define the cavity by the stator core and the mold for performing the partial molding process. The order of performing the partial molding process with respect to the divided sections of the first group may be arbitrarily set. Then the partial molding process is performed with respect to the divided sections of the second group. At this time, as both sides of each of the divided sections of the second group, that is, the divided sections of the first group, are already provided with the resin molding films, the second mold is used to define the cavity by the stator core, the mold and the resin molding films for performing the partial molding process. In this case, the order of performing the partial molding process with respect to the divided sections of the second group may be arbitrarily set. By subjecting the partial molding process to all the divided sections of the second group, the resin molding films formed using the first and the second molds are connected to be formed on the whole periphery of the stator core.

According to the first exemplary aspect of the invention, the number n of divided sections may be set to either an odd number or an even number. The aforementioned molding process needs only one type of mold, and the order of the partial molding process may be arbitrarily set. This makes it possible to perform the resin molding process more efficiently. It is to be understood that the variable mold may take various structures having, for example, a sliding portion, a replaceable part, and the like.

According to the second exemplary aspect of the invention, the contact area between end surfaces of adjacent resin molding films may be increased. This may enhance the so-called anchor effect, thus improving the bonding strength between the adjacent resin molding films.

According to the second exemplary aspect of the invention, the coil end portion that extends toward the end surface of the stator core can be fit with the portion having the smaller thickness when the coil is attached to the stator core. This makes it possible to reduce the axial dimension of the stator core to which the coil is attached. This may further reduce the size of the electric rotating machine. According to the second exemplary aspect of the invention, this may prevent the contact of the coil of the phase from being placed on the most outer periphery of the stator core with the boundary. This makes it possible to enhance the effect of preventing the failure, for example, a split of the resin molding film around the boundary, resulting in more stable insulating structure.

According to the third exemplary aspect of the invention, the mold having the aforementioned structure can be employed as the first mold for the resin molding process where the first and the second molds are employed. According to the third exemplary aspect of the invention, the end portion of the resin molding film is formed in a step-like manner so as to be adapted to the stepped portion. The end portion of the adjacent resin molding film to be formed subsequently may be placed to cover the step-like surface. The resultant overlapped portion of the resin molding film makes it possible to enhance the bonding strength.

According to the third exemplary aspect of the invention, the mold having the aforementioned structure can be employed as the second mold for the resin molding process where the first and the second molds are employed. According to the third exemplary aspect of the invention, the end abutment portion can be replaced so as to make the mold function as the first mold or the second mold. According to the third exemplary aspect of the invention, the mold can be employed as the variable mold. The end abutment portion may be formed into a structure having a slide core urged against an advanced position by a spring and the like.

The invention is not limited to the aforementioned embodiments, and various modifications based on the purpose of the invention are possible, which are regarded as within the scope of the invention.

What is claimed is:

1. A method of forming a resin film on a surface of a stator core including a ring-shaped yoke portion, a plurality of teeth each protruding from the yoke portion in a radial direction, and a plurality of slots formed between the teeth, comprising:
   forming the resin film on at least one of a plurality of sections of the stator core, with the plurality of sections divided around a circumference of the stator core with respect to an axial center thereof, by molding a synthetic resin material onto a surface of the least one of the plurality of sections; and
   repeating, subsequently, the molding on another section of the plurality of sections of the stator core with respect to the axial center so as to form the resin film on a whole periphery of the stator core.

2. The resin molding method according to claim 1, wherein:
   the plurality of sections include an even number of sections;
   the molding is performed with a first mold with a first cavity for forming the resin film on each of a first set of sections defined by the stator core and the first mold, and a second mold with a second cavity for forming the resin film on each of a second set of sections defined by the stator core, the second mold, and resin films formed by the first mold; and
   the first mold is used to form the resin film on the first set of sections that are divided and alternately arranged, and the second mold is thereafter used to form the resin molding film on the second set of sections that are divided and alternately arranged.

3. The resin molding method according to claim 1, wherein a variable mold allows a cavity for forming the resin film on each divided section, the cavity being defined by the stator core and the mold and being defined by the stator core, the mold, and the resin film formed on at least one adjacent divided section is used for the molding with respect to each divided section in sequence.

4. The resin molding method according to claim 1, wherein the stator core is equally divided into the plurality of sections.

5. The resin molding method according to claim 1, wherein an overlap portion is formed at the boundary of adjacently arranged resin films.

6. The resin molding method according to claim 1, wherein a boundary of adjacent sections are placed over a center of the teeth.

7. The resin molding method according to claim 1, wherein at least a portion of the resin film that has been formed on the yoke portion at both ends of the stator core has a thickness smaller than a thickness of the resin film that has been formed on the teeth.

8. The resin molding method according to claim 1, wherein coils of three-phases are attached to the stator core in layers and the boundary between adjacently arranged resin films is set between two coils structuring a coil group placed at an outermost periphery of the stator core.

* * * * *